US008256677B2

(12) United States Patent
Harris et al.

(10) Patent No.: US 8,256,677 B2
(45) Date of Patent: Sep. 4, 2012

(54) ENABLING HOLOGRAPHIC MEDIA BACKWARDS COMPATIBILITY WITH DUAL-USE MEDIA CARD CONNECTOR

(75) Inventors: Rodney C. Harris, Fort Collins, CO (US); Hiroshi Kamada, Kyoto (JP); Motofumi Yoshino, Uji (JP)

(73) Assignees: InPhase Technologies, Inc., Longmont, CO (US); Nintendo Co., Ltd., Kyoto (JP)

( * ) Notice: Subject to any disclaimer, the term of this patent is extended or adjusted under 35 U.S.C. 154(b) by 1088 days.

(21) Appl. No.: 12/101,223

(22) Filed: Apr. 11, 2008

(65) Prior Publication Data
US 2009/0014522 A1    Jan. 15, 2009

Related U.S. Application Data

(60) Provisional application No. 60/948,769, filed on Jul. 10, 2007.

(51) Int. Cl.
*G06K 7/10* (2006.01)
(52) U.S. Cl. ........ 235/457; 235/483; 235/375; 235/380; 235/441; 235/449; 235/492; 369/103
(58) Field of Classification Search ................... 235/457, 235/483, 375, 380, 441, 449, 451, 492; 369/103
See application file for complete search history.

(56) References Cited

U.S. PATENT DOCUMENTS

| | | |
|---|---|---|
| 5,082,337 A | 1/1992 | Chern et al. |
| 5,898,544 A | 4/1999 | Krinke et al. |
| 5,959,281 A | 9/1999 | Domiteaux |
| 6,103,454 A | 8/2000 | Dhar et al. |
| 6,386,920 B1 | 5/2002 | Sun |
| 6,398,567 B1 | 6/2002 | Nishimura |
| 6,482,551 B1 | 11/2002 | Dhar et al. |
| 6,650,447 B2 | 11/2003 | Curtis et al. |
| 6,743,552 B2 | 6/2004 | Setthachayanon et al. |

(Continued)

FOREIGN PATENT DOCUMENTS

EP    1 422 698 A2    5/2004
(Continued)

OTHER PUBLICATIONS

Hoskins, et al, "Monocular Architecture," InPhase Technologies, Inc., Oct. 2007, pp. 1-3.

(Continued)

*Primary Examiner* — Allyson Trail
(74) *Attorney, Agent, or Firm* — Vedder Price P.C.; Ajay A. Jagtiani

(57) ABSTRACT

A holographic read only memory card which can be coupled to and read by a card reader to which electronic read only memory cards can also be coupled to and read by the card reader is disclosed. The holographic read only memory card comprises: a housing having a compartment for receiving a holographic storage medium; a holographic storage medium having stored thereon holographic data; and optionally a an electronics panel member having an electronic memory component which can be read by the card reader when the holographic read only memory card is coupled to the electronic card reader. The housing comprises one or more card locating members to thereby repeatedly position the holographic read only memory card each time the holographic read only memory card is coupled to the electronic card reader so that the holographic data can be read.

30 Claims, 16 Drawing Sheets

U.S. PATENT DOCUMENTS

| | | | |
|---|---|---|---|
| 6,761,313 B2* | 7/2004 | Hsieh et al. ................ 235/451 |
| 6,765,061 B2 | 7/2004 | Dhar et al. | |
| 6,780,546 B2 | 8/2004 | Trentler et al. | |
| 6,801,260 B1 | 10/2004 | Veksland et al. | |
| 6,972,885 B2 | 12/2005 | Hiley et al. | |
| 7,118,394 B2 | 10/2006 | Yoneyama et al. | |
| 7,123,416 B1 | 10/2006 | Erdogan et al. | |
| 7,411,708 B2 | 8/2008 | Waldman et al. | |
| 7,719,847 B2* | 5/2010 | Mambakkam et al. ....... 361/737 |
| 7,823,793 B2* | 11/2010 | Higuchi et al. .............. 235/492 |
| 2002/0043562 A1* | 4/2002 | Zazzu et al. ................. 235/457 |
| 2002/0162939 A1 | 11/2002 | Heidrich | |
| 2002/0166893 A1 | 11/2002 | Li et al. | |
| 2002/0176181 A1 | 11/2002 | Jacobsen | |
| 2003/0034552 A1 | 2/2003 | Wada et al. | |
| 2003/0047608 A1 | 3/2003 | Huss et al. | |
| 2003/0096521 A1 | 5/2003 | Kikuchi et al. | |
| 2003/0206320 A1 | 11/2003 | Cole et al. | |
| 2004/0027625 A1 | 2/2004 | Trentler et al. | |
| 2004/0150872 A1 | 8/2004 | Neukermans et al. | |
| 2004/0194151 A1* | 9/2004 | Earhart ........................ 725/135 |
| 2004/0213464 A1 | 10/2004 | Hanson et al. | |
| 2005/0041557 A1* | 2/2005 | Yagi et al. .................... 369/103 |
| 2006/0006305 A1 | 1/2006 | Fukai | |
| 2006/0062040 A1* | 3/2006 | Dobashi et al. .............. 365/125 |
| 2006/0148569 A1* | 7/2006 | Beck .............................. 463/43 |
| 2006/0238841 A1 | 10/2006 | Anderson et al. | |
| 2006/0274391 A1 | 12/2006 | Dickson et al. | |
| 2006/0279821 A1 | 12/2006 | Riley et al. | |
| 2006/0279823 A1 | 12/2006 | Riley et al. | |
| 2007/0091399 A1 | 4/2007 | Ihas et al. | |
| 2008/0320308 A1* | 12/2008 | Kostiainen et al. ........... 713/171 |
| 2009/0073965 A1* | 3/2009 | Dowling et al. ............. 370/352 |

FOREIGN PATENT DOCUMENTS

EP          1 457 974 A1      9/2004

OTHER PUBLICATIONS

Hoskins, et al, "Monocular Architecture," (Presentation), InPhase Technologies, Inc., Oct. 2007, pp. 1-14.

Chuang, et al, "Demonstration of Holographic ROM Mastering, Replication, and Playback with a Compact Reader," InPhase Technologies, Inc., Oct. 2007, pp. 1-3.

Chuang, et al, "Demonstration of Holographic ROM Mastering, Replication, and Playback with a Compact Reader," (Presentation), InPhase Technologies, Inc., Oct. 2007, pp. 1-16.

Curtis, et al, "InPhase Professional Archive Drive Architecture," InPhase Technologies, Inc., Oct. 2007, pp. 1-65.

Urey, et al. "Scanner Design and Resolution Tradeoffs for Miniature Scanning Displays," Conference on Flat Panel Display Tech & Display Metrology, Proceedings of SPIE, vol. 3636, pp. 60-68, 1999.

PCT/US07/05636 International Search Report and the Written Opinion of the International Searching Authority, or the Declaration, mailed Mar. 13, 2008.

PCT/US07/77822 International Search Report and the Written Opinion of the International Searching Authority, or the Declaration, mailed Mar. 20, 2008.

PCT/US07/75176 International Search Report and the Written Opinion of the International Searching Authority, or the Declaration, mailed Apr. 3, 2008.

PCT/US07/81378 International Search Report and the Written Opinion of the International Searching Authority, or the Declaration, mailed May 7, 2008.

Shannon, Robert R., "Optical Transfer Function Basics," Cambridge University Press (XP-002549211), Dec. 31, 1997, pp. 268-275.

EP 07 841 458.8 Supplementary European Search Report mailed Oct. 23, 2009.

PCT/US2008/060014 International Search Report and the Written Opinion of the International Searching Authority, or the Declaration, mailed Aug. 8, 2008.

PCT/US2007/005636 International Preliminary Report on Patentability (Chap. 1 of the Patent Cooperation Treaty) and the Written Opinion of the International Searching Authority, mailed Sep. 18, 2008.

PCT/US2007/076979 International Search Report and the Written Opinion of the International Searching Authority, or the Declaration, mailed Aug. 20, 2008.

* cited by examiner

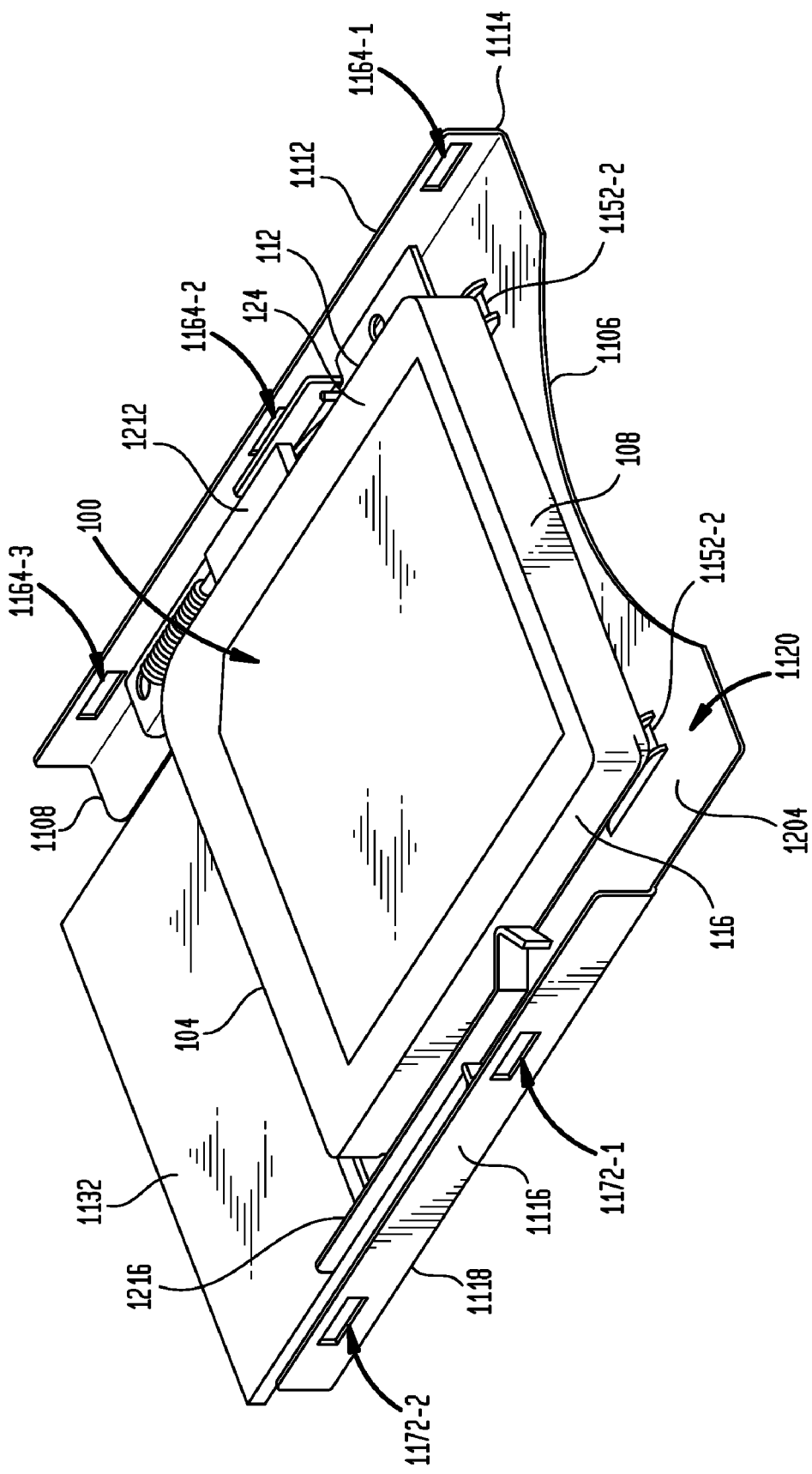

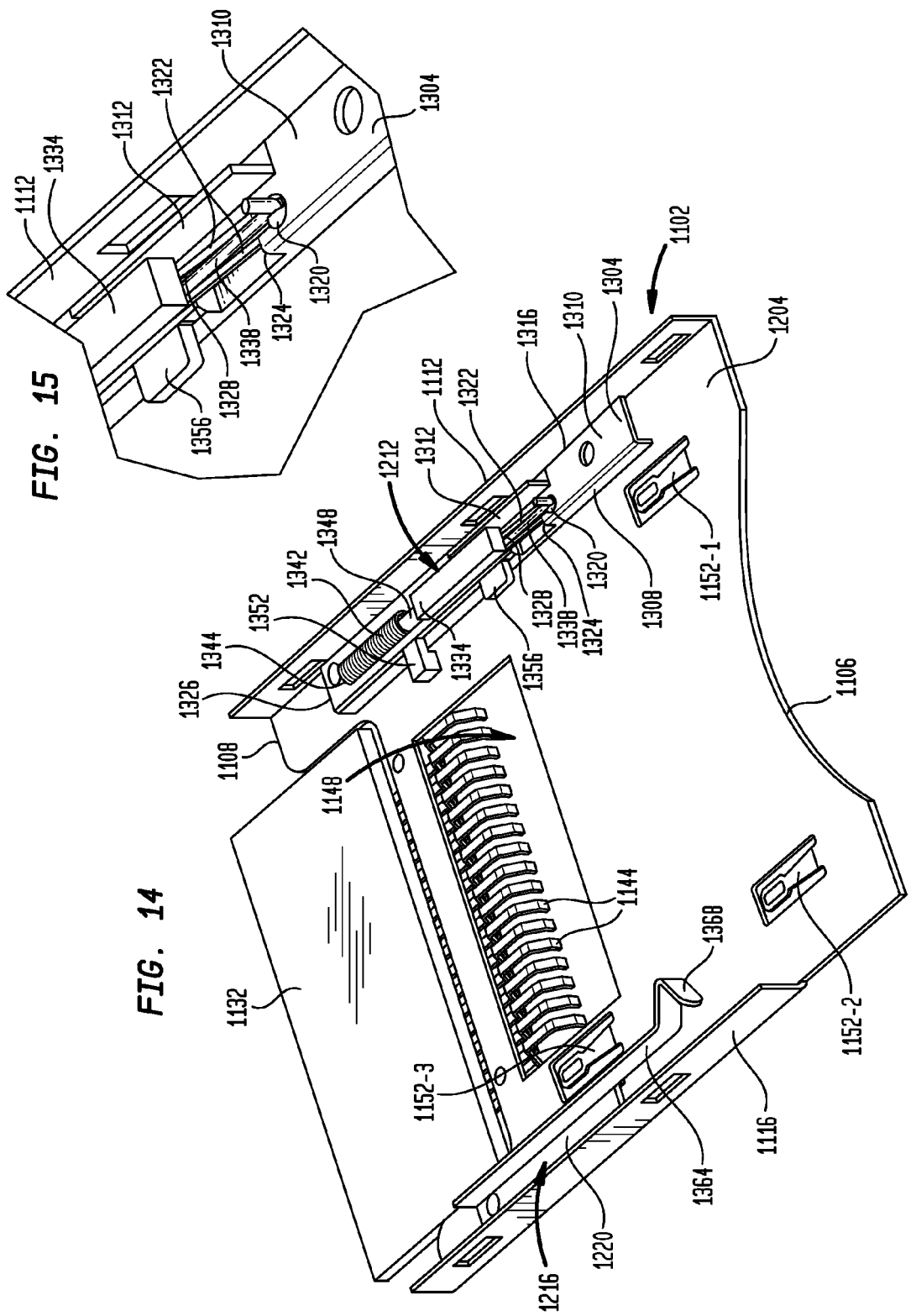

ENABLING HOLOGRAPHIC MEDIA BACKWARDS COMPATIBILITY WITH DUAL-USE MEDIA CARD CONNECTOR

CROSS-REFERENCE TO RELATED APPLICATIONS

This application makes reference to and claims the priority date of Prov. App. No. 60/948,769, entitled "A METHOD FOR ENABLING MEDIA BACKWARDS COMPATIBILITY BY DUAL-USE MEDIA SOCKET DESIGN," filed Jul. 10, 2007, the entire disclosure and contents of which is hereby incorporated by reference.

STATEMENT OF JOINT RESEARCH AGREEMENT

In compliance with 37 C.F.R. §1.71(g) (1), disclosure is herein made that the claimed invention was made pursuant to a Joint Research Agreement as defined in 35 U.S.C. 103 (c) (3), that was in effect on or before the date the claimed invention was made, and as a result of activities undertaken within the scope of the Joint Research Agreement, by or on the behalf of the InPhase Technologies, Inc. and Nintendo Co., Ltd.

BACKGROUND

1. Field of the Invention

The present invention relates generally to a holographic read only memory card which may be coupled to a card connector and read by a card reader to which electronic read only memory cards may also be coupled to and read by.

2. Related Art

Suppliers of electronic equipment that makes use of removable media of pre-recorded data content can face backwards-compatibility issues when developing newer versions of their products to use updated or newly developed media technologies. For example, the maker of a computer or video game station console might want to release a newer version of such a device that takes advantage of the latest improvements in storage capacity, size and cost reduction, yet makes it feasible for their existing customers to use previously purchased media, resulting in more incentive for these customers to buy the newer version of device. As a result the newer product may be designed to have multiple media slots that accept different media developed at different times in the evolutionary life cycle of the product line, some accepting the latest technology and others accepting older and what may be outdated media.

Accordingly, it would be desirable to provide in such newer media technologies the ability to provide backwards compatibility to read the earlier (older) media with the devices that read such more recent (newer) media.

SUMMARY

According to a first broad aspect of the present invention, there is provided a device comprising a holographic read only memory card which can be coupled to and read by a card reader to which electronic read only memory cards can also be coupled to and read by the holographic read only memory card comprising:
 a housing having a compartment for receiving a holographic storage medium; and
 a holographic storage medium having stored thereon holographic data;
 wherein the housing comprises one or more card locating members to thereby repeatedly position the holographic read only memory card each time the holographic read only memory card is coupled to the card reader so that the holographic data can be read.

According to a second broad aspect of the invention, there is provided a device comprising a holographic read only memory card which can be coupled to and read by a card reader to which electronic read only memory cards can also be coupled to and read the holographic read only memory card comprising:
 a housing having a compartment for receiving a holographic storage medium; and
 a holographic storage medium having stored thereon holographic data; and
 an electronics panel member having an electronic memory component which can be read by the card reader when the holographic read only memory card is coupled to the electronic card reader;
 wherein the housing comprises one or more card locating members to thereby repeatedly position the holographic read only memory card each time the holographic read only memory card is coupled to the electronic card reader so that the holographic data can be read.

BRIEF DESCRIPTION OF THE DRAWINGS

The invention will be described in conjunction with the accompanying drawings, in which:

FIG. 13 is a top perspective view similar to that of FIG. 10, but with components of the card connector embodiment removed to better illustrate how the EROM card fits within and cooperates with features and/or components of the card connector;

FIG. 14 is a view similar to that of FIG. 13 but with the EROM card removed (i.e., a fully ejected card position) from the card connector embodiment;

FIG. 15 is an enlarged breakout of a portion of FIG. 14 to better illustrate certain features shown therein;

DETAILED DESCRIPTION

Figure 1:
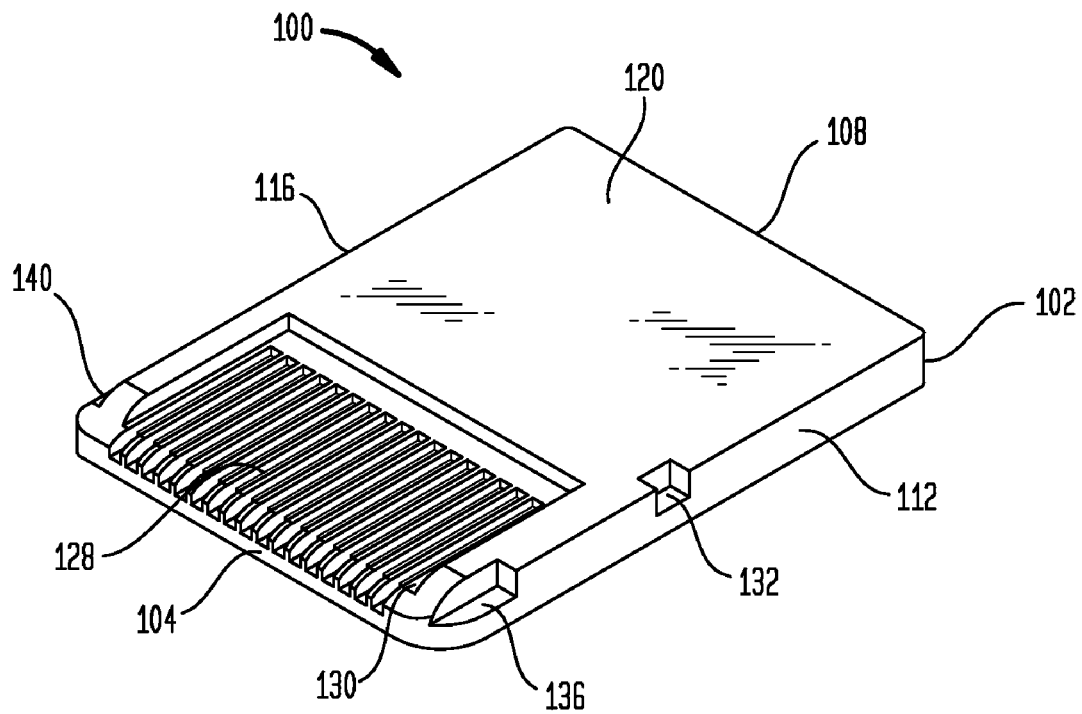
FIG. 1 is a bottom perspective view of a representative embodiment of a flash or electrical ROM memory card (EROM card)

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "side," "front," "frontal," "forward," "rear," "rearward," "back," "trailing," "above", "below", "left", "right", "horizontal", "vertical", "upward", "downward", etc. are merely used for convenience in describing the various embodiments of the present invention. The embodiments of the present invention may be oriented in various ways. For example, the embodiments shown in FIGS. 1 through 21 may be flipped over, rotated by 90° in any direction, etc.

For the purposes of the present invention, the term "disk" refers to a disk-shaped holographic storage medium.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded page-wise, the signal beam may be encoded with a data modulator, e.g., a spatial light modulator (SLM), etc.

For the purposes of the present invention, the term "storage medium" refers to any component, material, etc., capable of storing data which may be in the form of information, operable programs (e.g., software), such as, for example, a holographic storage medium.

For the purposes of the present invention, the term "holographic storage medium" refers to medium that has a least one component, material, layer, etc., that is capable of recording and storing one or more holograms (e.g., bit-wise, linear array-wise or page-wise) as one or more patterns of varying refractive index imprinted into the medium. Examples of holographic media useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003/0206320 (Cole et al.) published Nov. 6, 2003; and U.S. Patent Application No. 2004/0027625 (Trentler et al.), published Feb. 12, 2004, the entire disclosure and contents of which are herein incorporated by reference. A holographic storage medium may be any type of holographic storage medium including: a transparent holographic storage medium, a holographic storage medium including a plurality of components or layers such as a reflective layer, a holographic storage medium including a reflective layer and a polarizing layer so reflection may be controlled with polarization, a holographic storage medium including a variable beam transmission layer that may be pass, absorb, reflect, be transparent to, etc., light beams, grating layers for reflecting light beams, substrates, substrates with servo markings, etc.

For the purposes of the present invention, the term "holographic recording" refers to the act of recording a hologram in a holographic storage medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For the purposes of the present invention, the term "reading data" refers to retrieving, recovering, or reconstructing data (e.g., holographic data) stored in a storage medium (e.g., a holographic storage medium), and may include using, displaying, etc., such retrieved, recovered, or reconstructed data.

For the purposes of the present invention, the term "recording data" refers to storing or writing data (e.g., holographic data) into a storage medium (e.g., a holographic storage medium).

For the purpose of the present invention, the term "device" may refer to an apparatus, a mechanism, equipment, a machine, a combination of elements, components, etc.

For the purpose of the present invention, the term "holographic storage system or device" refers to a system or device which may record (store) holographic data, which may read (recover) holographic data, or which may record (store) and read (recover) holographic data.

For the purpose of the present invention, the term "media content label" refers to a label attached to a media card that presents information describing the card's data contents.

For the purpose of the present invention, the term "flash memory" refers to non-volatile computer memory that may be electrically erased and reprogrammed.

For the purpose of the present invention, the term "ROM" refers to read-only memory. ROM may include memory which cannot be modified (at least not very quickly or easily), memory which may be erased and re-programmed multiple times such as, for example, Erasable Programmable read-only memory (EPROM) and flash Electrically Erasable Programmable read-only memory (EEPROM), etc.

For the purpose of the present invention, the term "SSM" refers to a solid state memory device, such as an electronic memory card.

For the purpose of the present invention, the terms "EROM or E-ROM" refer to an electronic or solid-state read-only memory device.

For the purpose of the present invention, the terms "H-ROM" or "HROM" refer to a holographic read-only memory device.

For the purpose of the present invention, the term "compatible cards" refers to memory cards which may be used interchangeably in a given card connector, and are thus "compatible" with that card connector.

For the purpose of the present invention, the terms "backwards compatible," "backwards compatibility," etc. refer to memory cards of an earlier (older) design (in terms of shape, mechanism, function, hardware, software, technology, etc.) compared to more recent (newer) card designs (also in terms of shape, mechanism, function, hardware, software, technology, etc.), but which are able to compatibly function with a card connector designed for the older card, or designed to accommodate both the newer and older card.

For the purpose of the present invention, the term "memory card" refers to a solid-state electronic and/or holographic memory data storage device which may be used with digital cameras, handheld and portable (mobile) computers, personal digital assistants (PDAs), telephones, music players, video game players, etc., as well as combinations thereof.

For the purpose of the present invention, the term "card reader" refers to a device which reads memory cards so that the data, programs, etc., contained therein may be displayed, printed, used, manipulated, operated, etc.

For the purpose of the present invention, the term "card connector" (also referred to interchangeably as a "card socket") refers to device which receives, is coupled to, has inserted therein, etc., memory cards and which enables the memory cards to be read by a card reader. In some embodiments, the card connector may be simply electronically connected to the card reader, may be the integral with or structurally part of the card reader, etc.

For the purposes of the present invention, the term "fully inserted card position" refers to when a memory card is fully inserted and locked position within the card connector so that the memory card may be read by a card reader.

For the purposes of the present invention, the term "partially inserted card position" refers to when a memory card is partially or fully inserted within the card connector but is not in a locked position so that the memory card may or may not be readable by a card reader.

For the purposes of the present invention, the term "fully ejected card position" refers to when a memory card is in a position where the card is fully, completely, totally, etc., ejected from within the card connector so that the memory card cannot be read by a card reader.

For the purposes of the present invention, the term "partially ejected card position" refers to when a memory card is partially, but not fully, ejected from within the card connector so that the memory card cannot be read by a card reader.

For the purposes of the present invention, the term "card locating member" refers to one or more elements, features, surfaces, recesses, notches, protrusions, etc., which may be used to repeatedly locate a memory card when in a fully inserted card position within the card connector. The card locating member may repeatedly locate the memory card in one or more of: the side-to-side direction, bottom-to-top direction, front-to rear direction, etc.

For the purposes of the present invention, the term "repeatably locate" refers to a memory card which, when in a fully inserted card position, is positioned in the card connector each time such that a card reader may read the data on the memory card in a reproducible, consistent and correct manner.

For the purposes of the present invention, the term "undeformed state" refers to the position of an element, feature, component, segment, etc., without any biasing forces being applied thereto.

For the purposes of the present invention, the term "deformed state" refers to the position of an element, feature, component, segment, etc., with any biasing forces being applied thereto, e.g., by link 1338/shaft 1504 pressing against the unattached end of segment 1322, as described below.

For the purpose of the present invention, the term "portable electronic device" refers to an electronic device which is relatively mobile and which may be carried by the user relatively easily from one place to another. Portable electronic devices may include, for example, digital cameras, portable or laptop computers, personal digital assistants (PDAs), video game players, etc.

Description

In portable electronic devices such as digital cameras, portable or laptop computers, personal digital assistants (PDAs), video game players, etc., an electronic memory card (e.g., an EROM card) may be provided for storing, downloading, swapping, etc., electronic data, operable programs, etc. In order to read and utilize the electronic memory card (by utilizing a card reader), it may be necessary to provide a card connector for the portable device, to receive the memory card, where the card connector is simply electronically connected to the card reader, or where the card connector is integral with or forms part of the card reader. For example, the card connector may provide the ability to electronically connect the memory card with a microprocessor in the portable electronic device which is able to read the memory card. In addition, the card connector may be required to accommodate multiple electronic memory cards having different lengths, widths, thicknesses, shapes, configurations, functions, couplings, etc., that may also be used with many different types of portable electronic devices. See, for example, U.S. Pat. No. 6,386,920 (Sun), issued May 14, 2002, which describes a card connector in the form of a socket device for electronic memory cards which is illustrated as being able to receive upwards of four different electronic memory cards having different lengths, widths, thicknesses, shapes, configurations, functions, couplings, etc.

In place of electronic memory cards, holographic memory cards may be used with at least some of these portable electronic devices. Holographic memory cards may provide the ability to store significantly more data than electronic memory cards, provide more updated or current versions of programs that provide enhanced features (compared to earlier electronic memory cards), provide memory storage that is more permanent or at least more difficult, for example, to accidentally (or intentionally) erase or copy, thus making it more difficult to replicate or "pirate" whatever data, programs, etc., is stored on the memory card (or for the user to accidentally lose the stored data, programs, etc.), etc. But because electronic memory cards have been around for quite a bit longer, and because the portable devices using such electronic memory cards may be owned by many different users, it may not be practical to simply construct portable devices for use by holographic memory cards only. Also, in some cases, it may be desirable for the user of the portable device to be able to still use and read the electronic memory cards, and especially pre-existing electronic memory cards, with the portable device, be it a digital camera, portable computer, video game player, etc.

Creating a holographic memory cards, as well as card connectors for reading, using, receiving, coupling to, etc., such cards that are compatible with pre-existing electronic memory cards may present challenges. For example, a holographic memory card design may need to be made sufficiently similar (but not necessarily identical) to a pre-existing electronic memory card so that the pre-existing electronic memory card may be inserted into a card connector and then read by a card reader designed for the holographic memory card. In addition, while data that is not changed may be permanently stored on the holographic storage medium of the holographic memory card, some data which may change or be changed during use and over time (for example, dates, scores, etc.) and which may need to be stored permanently or temporarily, transferred to other devices, etc., may require at least some changeable electronic memory capability. For example, the holographic memory card (as well as the card reader and related card connector receiving and reading same) may incorporate the ability to both read the holographic storage medium, as well as to read and/or store electronic data in the electronic memory component of the memory card so that at least some data may be changeable, as well as storable for future reading, modification, etc., during use and over time.

Figure 2:
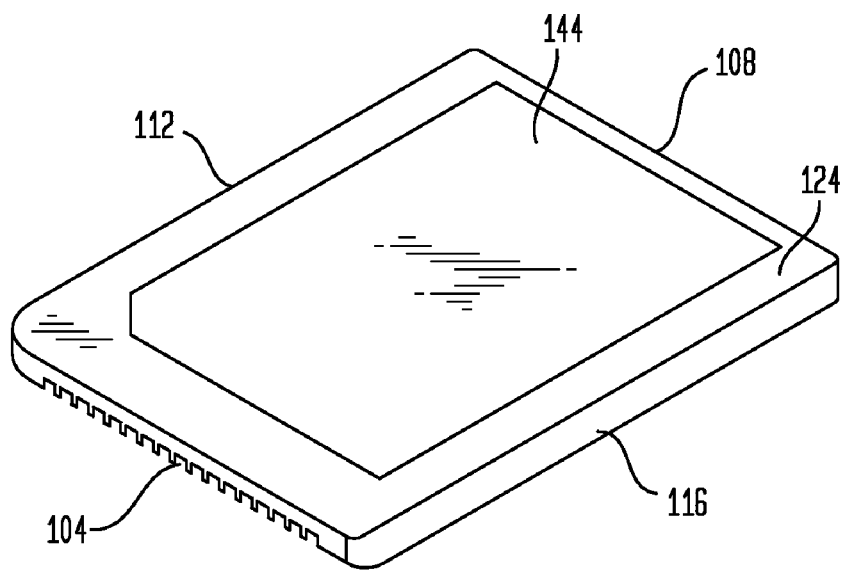
FIG. 2 is a top perspective view of the card of FIG. 1.
Figure 3:
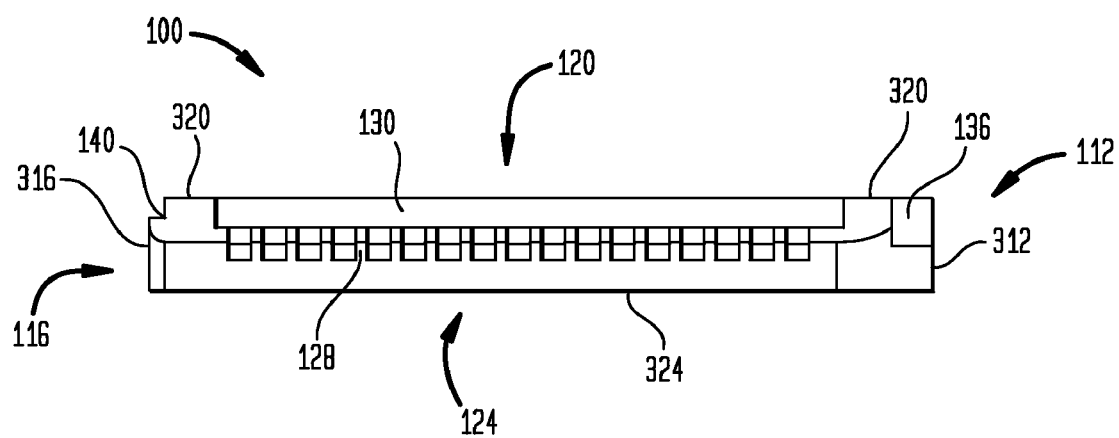
FIG. 3 is a electrical contact interface end view of the card of FIGS. 1-2.

FIGS. 1 through 3 illustrate an embodiment of a pre-existing electronic memory or solid state memory (SSM) electronic read only memory (EROM) storage card, while FIGS. 4 through 9 illustrate how an embodiment of a holographic read-only memory storage card (HROM) might be designed to allow use of both the EROM and HROM cards with the same card connector and/or card reader. The data, programs, etc., recorded, stored, etc., on the HROM card may be read and used by a holographic reading device or system, for example, one described in U.S. Pat. Application No. 2006/0279823 (Riley et al.), published Dec. 14, 2006, and U.S. Pat. Application No. 2006/0238841 (Anderson et al.), published Dec. 14, 2006 (the entire disclosure and contents of which are hereby incorporated by reference), while the EROM card may be received by, inserted into, etc., a card connector and read through a separate electrical connection and by a separate electronic device or system. See, for example, U.S. Pat. No. 7,118,394 (Yoneyama et al.), issued Oct. 10, 2006; U.S. Pat. No. 6,398,567 (Nishimura et al.), issued Jun. 4, 2002; and U.S. Pat. Application No. 2003/0096521 (Kikuchi et al.), published May 22, 2003 (the entire disclosure and contents of which are hereby incorporated by reference), which illustrate some card connectors for receiving/insertion of electronic memory cards.

FIGS. 1 and 2 provide bottom and top perspective views of an embodiment of a representative flash or electronic ROM memory card (EROM card), which is generally indicated as 100. Referring to FIGS. 1 and 2, EROM card 100 may be provided with an outer housing, indicated generally as 102. EROM card 100 is shown in FIGS. 1 and 2 as having a generally square-shaped configuration but may also have other shapes and configurations, for example, rectangular, etc. EROM 100 is shown FIGS. 1 and 2 as comprising a housing 102 having a leading or forward electrical connector edge 104, a rearward or trailing edge 108 laterally spaced apart from, and generally parallel with, forward edge 104, and a first side edge 112 connecting one end of each of forward edge 104 and rearward edge 108. Housing 102 is also provided with a second side edge 116 laterally spaced apart from and generally parallel with first side edge 112 and connecting the other end of each of forward edge 104 and rearward edge 108, as well as a generally square-shaped bottom section 120, and a similarly generally square-shaped top section 124.

As shown in FIG. 1, bottom section 120 is provided with an electrical contact interface 128, which positioned within recess 130 in bottom section 120 at or proximate to forward edge 104 and which has a width which is slightly smaller than the width between first side edge 112 and second side edge 116. First side edge 112 has formed therein a first retainer and/or ejection feature in the form of a generally cube-shaped recess 132 between forward edge 104 and rearward edge 108 (shown in FIG. 1 as being approximately midway between forward edge 104 and rearward edge 108), and a second retainer and/or ejection feature 136 in the form of a notch-shaped recess formed at or proximate to where first edge 112 connects to forward edge 104. Second side edge 116 has formed therein a card orientation feature in the form of a generally L-shaped groove 140 extending from or proximate forward edge 104 to or proximate rearward edge 108. As shown in FIG. 2, top section 124 is provided with a media content label, indicated as 144.

FIG. 3 is electrical contact interface edge or end view of EROM card 100 of FIGS. 1 and 2 to illustrate the various guide surfaces of EROM card 100. As shown in FIG. 3, EROM card 100 has a first side guide surface 312 along first side edge 112, a second side guide surface 316 along second side edge 116, a bottom guide surface 320 along bottom section 120, and a top guide surface 324 along top section 124.

Figure 4:
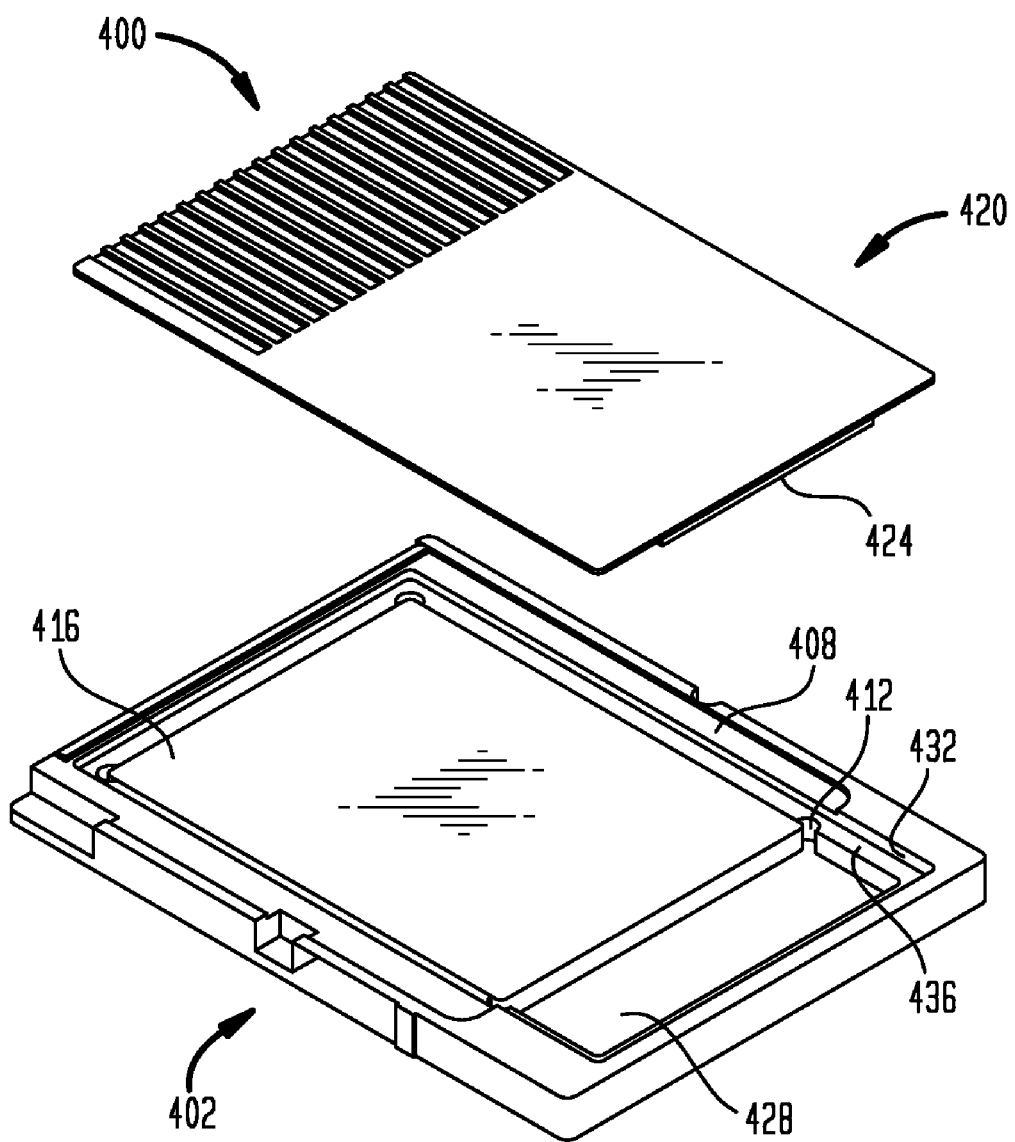
FIG. 4 is perspective view of an embodiment of a holographic read only memory (HROM) card with the electronic panel member detached from the housing.

FIG. 4 shows an embodiment of a holographic ROM memory card (HROM card), which is generally indicated as 400. As shown in FIG. 4, HROM card 400 comprises a generally rectangular-shaped housing, indicated generally as 402. Housing 402 has a recessed inner compartment 408 which is provided with or has formed therein a retainer section, indicated generally as 412, for receiving a holographic storage medium 416. HROM card 400 also comprises a generally rectangular-shaped electronics panel member 420 (shown in FIG. 4 as being detached from housing 402). Panel member 420 may be optionally provided with an electronic flash memory component, indicated generally as 424, to provide, for example, flash electronic "user" memory for card 400 (e.g., to provide updates, dates accessed, etc.), that may not be recordable on holographic storage medium 416 during, for example, use of HROM card 400, as opposed to before HROM card 400 is sold, provided, etc., to the user and when holographic data is normally recorded, stored, etc., on medium 416, and which fits within portion 428 of compartment 408 when electronics panel member 420 is attached, secured, etc., to housing 402. As also shown in FIG. 4, housing 402 has provided or formed therein an upper generally rectangular-shaped recessed portion 432 for receiving and retaining electronics panel and which has a shoulder 436 for on which the electronics panel member 420 is seated when attached, secured, etc., to housing 402 so that HROM card 400 is ready for use.

Figure 5:
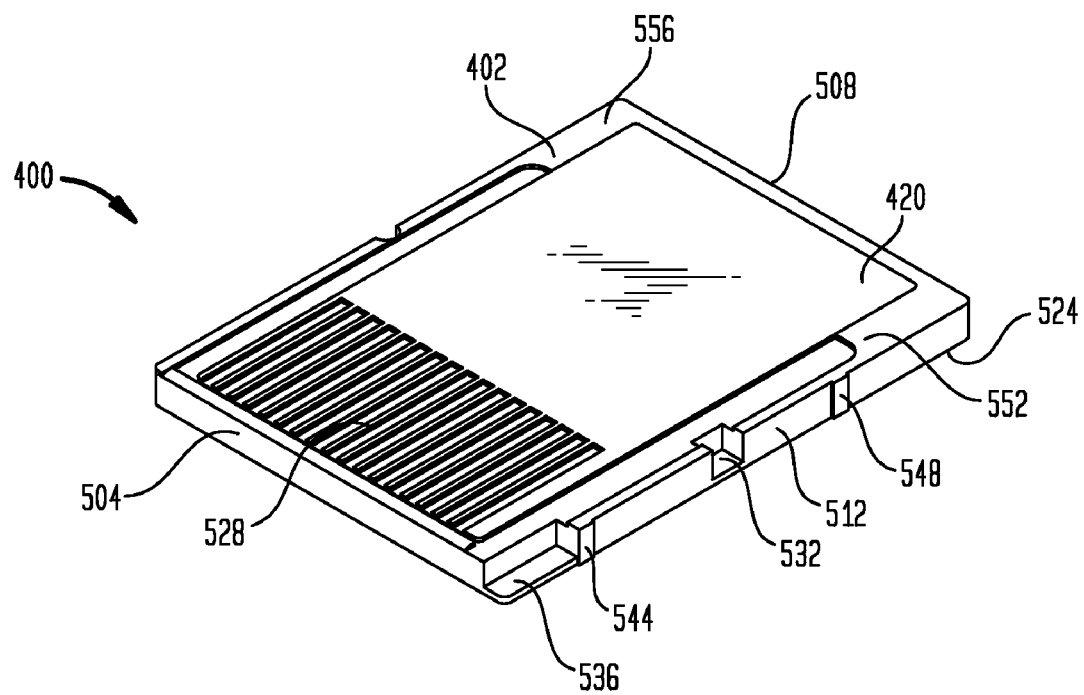
FIG. 5 is bottom perspective view of the HROM card of FIG. 4.
Figure 6:
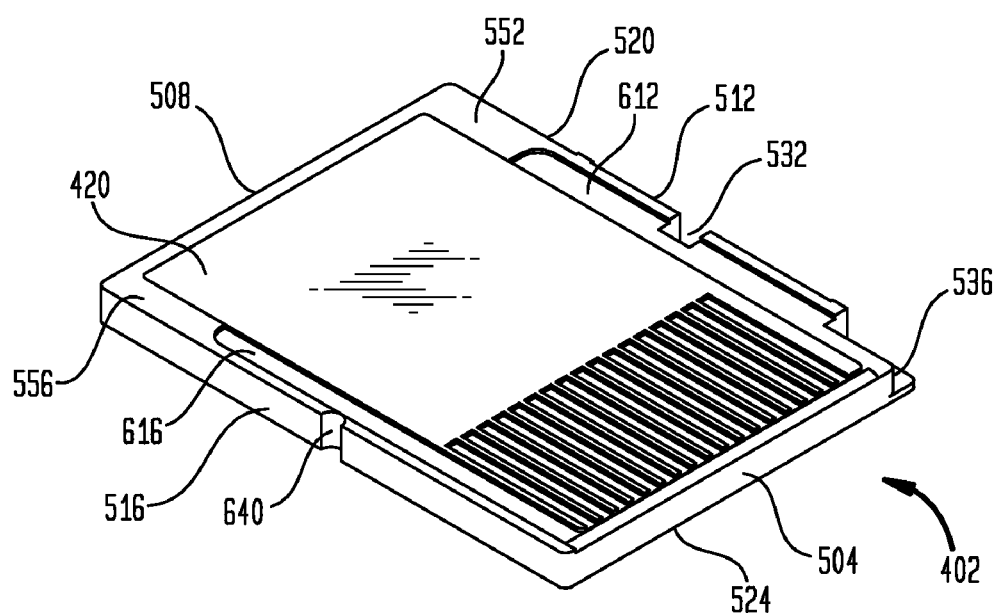
FIG. 6 is an alternative bottom perspective view of the HROM card shown in FIG. 5.

FIGS. 5 and 6 provide alternative bottom perspective views of HROM card 400 of FIG. 4 to illustrate other features of HROM card 400. Referring to FIGS. 5 and 6, housing 402 of HROM card 400 has leading or forward edge 504, a rearward or trailing edge 508 laterally spaced apart from, and generally parallel to, forward edge 504, and a first side edge 512 connecting one end of each of forward edge 504 and rearward edge 508. Housing 402 is also provided with a second side edge 516 laterally spaced apart from, and generally parallel to, first side edge 512 and connecting the other end of each of forward edge 504 and rearward edge 508, Electronic panel member 420, which is attached, secured, etc., to housing 402, completes bottom section 520 of housing 402, with bottom section 520 (including panel member 420) thus being generally rectangular-shaped, as shown in FIGS. 5 and 6. Housing 402 is also provided with a generally rectangular-shaped top section, indicated generally as 524.

As shown in FIG. 5, panel member 420 is provided with an electrical contact interface, indicated generally as 528, at or proximate to forward edge 504. First side edge 512 has formed therein, for example, a first retainer and/or ejection feature in the form of a generally cube-shaped recess 532 between forward edge 504 and rearward edge 508 (for example, as shown in FIGS. 5 and 6, approximately midway between forward edge 504 and rearward edge 508), and a second retainer and/or ejection feature 536 in the form of a recess formed at or proximate to where first side edge 512 connects to forward edge 504. As shown in FIG. 5, first side edge 512 is also provided with a first side-to-side card locating member in the form of, for example, protrusion 544 provided on or formed in housing 402 proximate second feature (recess) 536, as well as a second side-to-side card locating member in the form of, for example, protrusion 548 provided on or formed in housing 402 which is located between second feature (recess) 536 and rearward edge 508 (for example, as shown in FIG. 5, approximately midway between feature (recess) 536 and rearward edge 508). As also shown in FIG. 5, bottom section 520 of housing 402 has a first side portion 552 adjacent and connected to first side edge 512, and a second side portion 556 adjacent and connected to second side edge 516.

As shown in FIG. 6, first side portion 552 of bottom section 520 has formed therein a recessed first bottom guide and positioning surface, indicated as 612, while second side portion 556 of bottom section 520 has formed therein a second recessed bottom guide and positioning surface, indicated as 616. Surfaces 612 and 616 may each be engaged by respective guide or positioning fingers (not shown) of the card connector (also not shown). As also shown in FIG. 6, second side edge 516 has formed therein a card insertion reference feature in the form of, for example, a notch 640 extending from top section 524 to second side portion 556.

Figure 7:
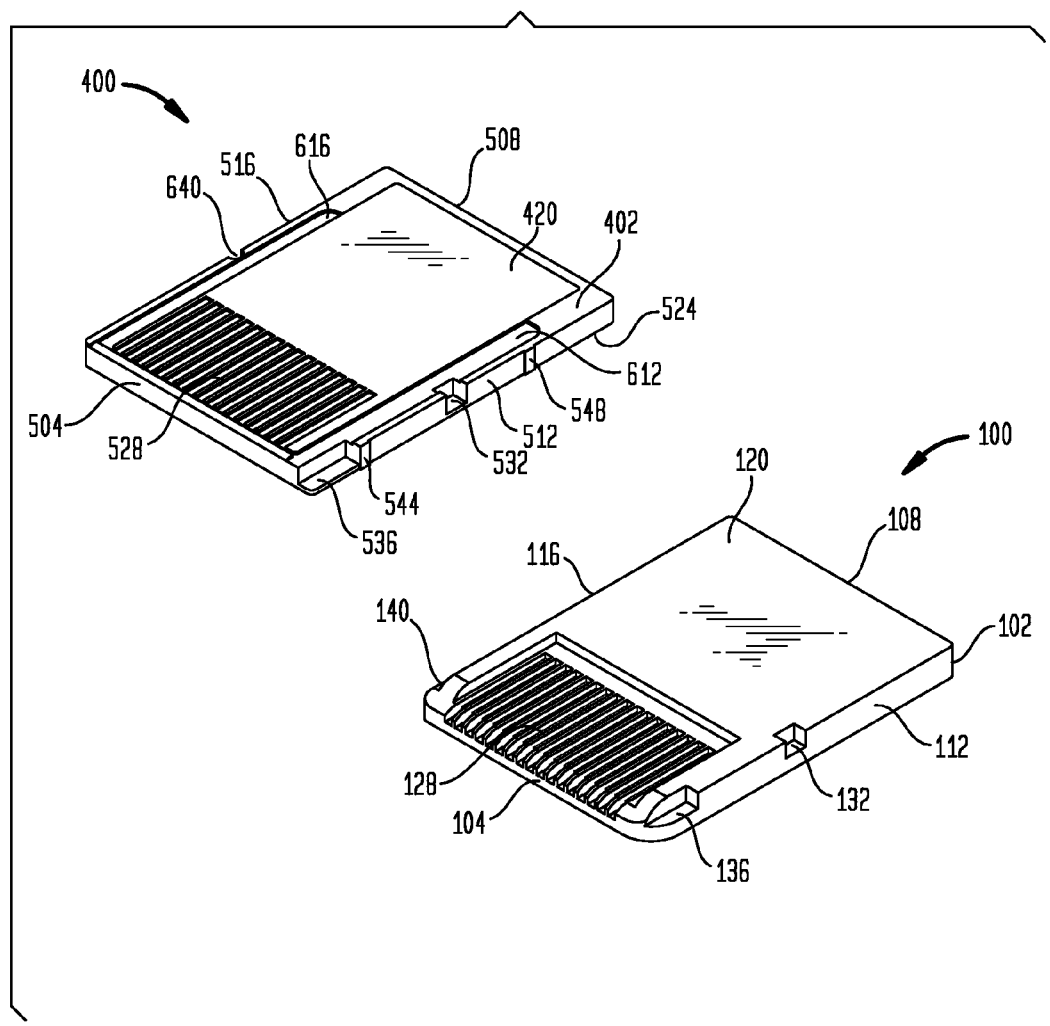
FIG. 7 is a side-by-side bottom perspective view comparing the configurations of the EROM card of FIGS. 1-3 and the HROM card of FIGS. 4-6.

FIG. 7 is a side-by-side bottom perspective view of EROM card 100 of FIGS. 1-3 and bottom perspective view of HROM card 400 of FIGS. 4-6 comparing the compatibility of the configurations of these cards. As shown in FIG. 6, various features of HROM card 400 correspond to various features of EROM card 100. For example, HROM card 400 has electrical contact interface 528 (corresponding to electrical contact interface 128 of EROM card 100), a first retainer and/or ejection feature (recess) 532 (corresponding to first retainer and/or ejection feature (recess) 132 of EROM card 100), and a second retainer and/or ejection feature (recess) 536 (corresponding to second retainer and/or ejection feature (recess) 136 of EROM card 100).

Figure 8:
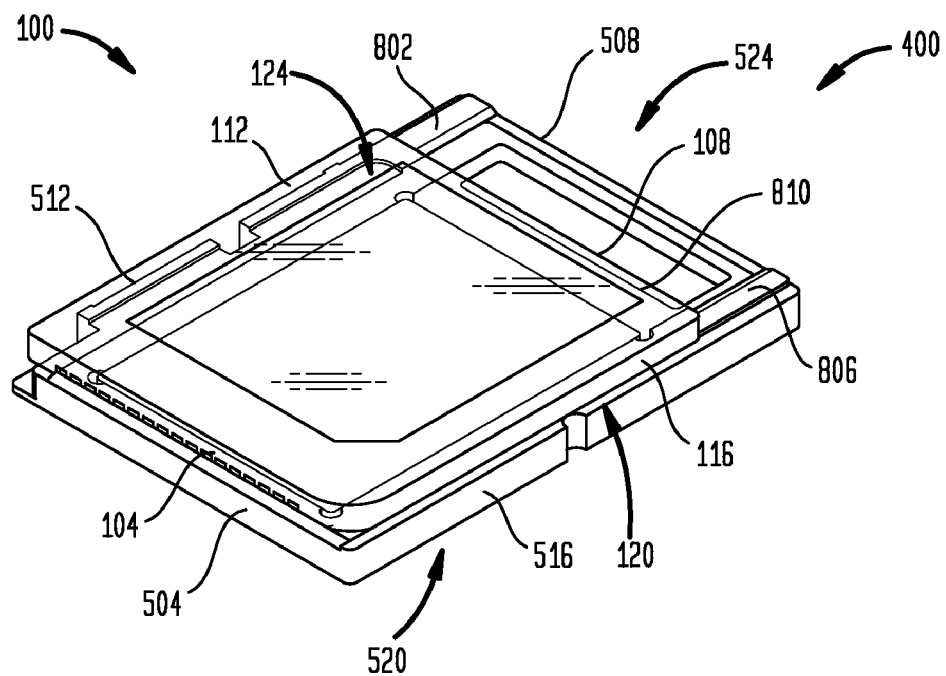
FIG. 8 is a top perspective view of the superimposed HROM and E-ROM cards of FIG. 7.
Figure 9:
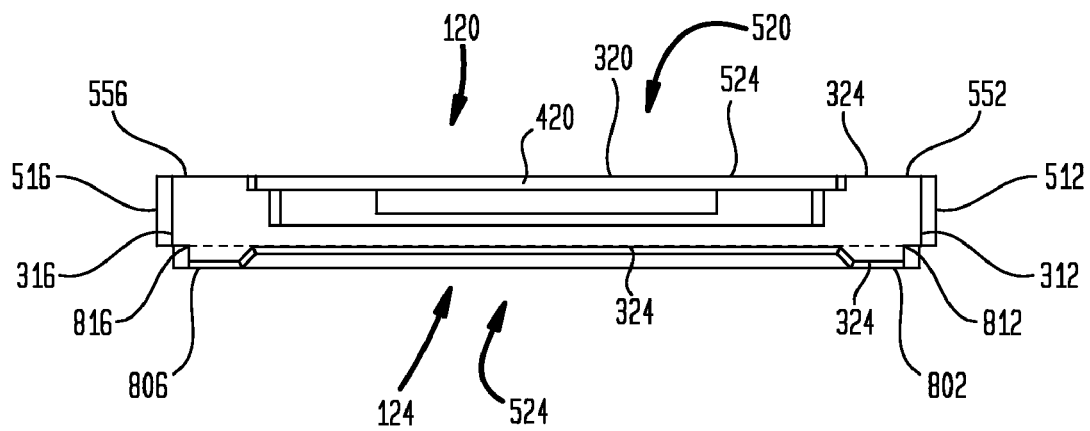
FIG. 9 is side view but in a reversed perspective of the superimposed HROM and E-ROM cards of FIG. 8.

The compatibility, as well as differences, of the configurations of EROM card 100 and HROM card 400 are further illustrated by FIGS. 8 and 9. FIG. 8 provides a top perspective view of HROM card 400 superimposed on E-ROM card 100 and shows top section 524 being provided with a first top ridge 802 (extending along adjacent side edge 512), a second top ridge 806 (extending along adjacent side edge 516) with an inwardly curved rearward portion 810 formed between and connecting first top ridge 802 and second top ridge 806 proximate rearward edge 508. FIG. 9 provides a side view (with a reversed perspective relative to the view of FIG. 8 in that the respective tops and bottoms of cards 100 and 400 are shown in reversed order) of HROM card 400 superimposed on E-ROM card 100 with the respective bottom section 520 and bottom section 120 facing upwardly, and the respective top section 524 and top section 124 facing downwardly. As can be seen in FIG. 7, HROM card 400 has a length (i.e., from forward edge 504 to rearward edge 508) that is longer than that (i.e., from forward edge 104 to rearward edge 108) of EROM card 100, but has a width (i.e., from first side edge 512 to second side edge 516) that is similar to, although slightly larger than, the width (i.e., from first side edge 112 to second side edge 116) of EROM card 100. See also FIG. 9. This slightly larger but similar width of HROM card 400 and EROM 100 enables each of these cards to be coupled, received, inserted, etc., within the same card connector component of a backwards compatible card reader. But as shown in FIG. 9, side edges 512 and 516 of HROM card 400, which provide side edge guide surfaces for card 400, are of a sufficiently different configuration from side edge guide surfaces 312 and 316 of EROM card 100 so that HROM card 400 may be repeatedly positioned or located (with the aid of protrusions 544 and 548 not shown in FIG. 9, alone or in combination with other features on a card connector in which HROM card 400 is in a fully inserted card position) each time in the same or similar position within the card connector component of the card reader so that the holographic data recorded, stored, etc., on holographic storage medium 416 may be read reproducibly, consistently and correctly. Similarly, as also shown in FIGS. 8 and 9, first top ridge 802 (from top section 524) and first side edge 512 have formed therein at the juncture thereof a first side-to-side card locating surface, for example, a recess in the form of notch 812 adjacent and extending along first side edge 512, while second top ridge 806 (from top section 524) and second side edge 516 have formed therein at the juncture thereof a second side-to-side card locating surface, for example, a recess in the form of notch 816 adjacent and extending along first side edge 512, so that HROM card 400 may again be repeatedly positioned each time within the card connector component of the card reader so that the holographic data recorded, stored, etc., on holographic storage medium 416 may be read.

A pre-existing EROM card connector may not accept the HROM card. For example, if the HROM card has a wider width (e.g., as shown for embodiment of HROM card 400 in FIG. 9), the HROM card would precluded from being inserted into a pre-existing EROM card connector accepting an EROM card having a narrower width (e.g., as shown for the embodiment of the EROM card 100 in FIG. 9). In fact, making the HROM card non-insertable into a pre-existing card connector or card socket for an EROM card may be useful in preventing a user from mistakenly assuming that the HROM card would work or be usable with the pre-existing card connector for the EROM card. Accordingly, designing a card connector which: (1) may accept both an HROM card and an EROM card; (2) be able to position or locate each of the respective cards uniquely using features on the cards, alone or in combination with other features on the card connector; and (3) be able to distinguish between the two cards when each is respectively inserted into the card connector may allow for each card to be uniquely identified, used, etc., by the card connector, for example, in conjunction with a card reader. For example, after insertion of either the EROM card or HROM card in the card connector, card identification may be carried out by performing an "identification-read" step by attempting to read the inserted card electronically and/or holographically.

Figure 10:
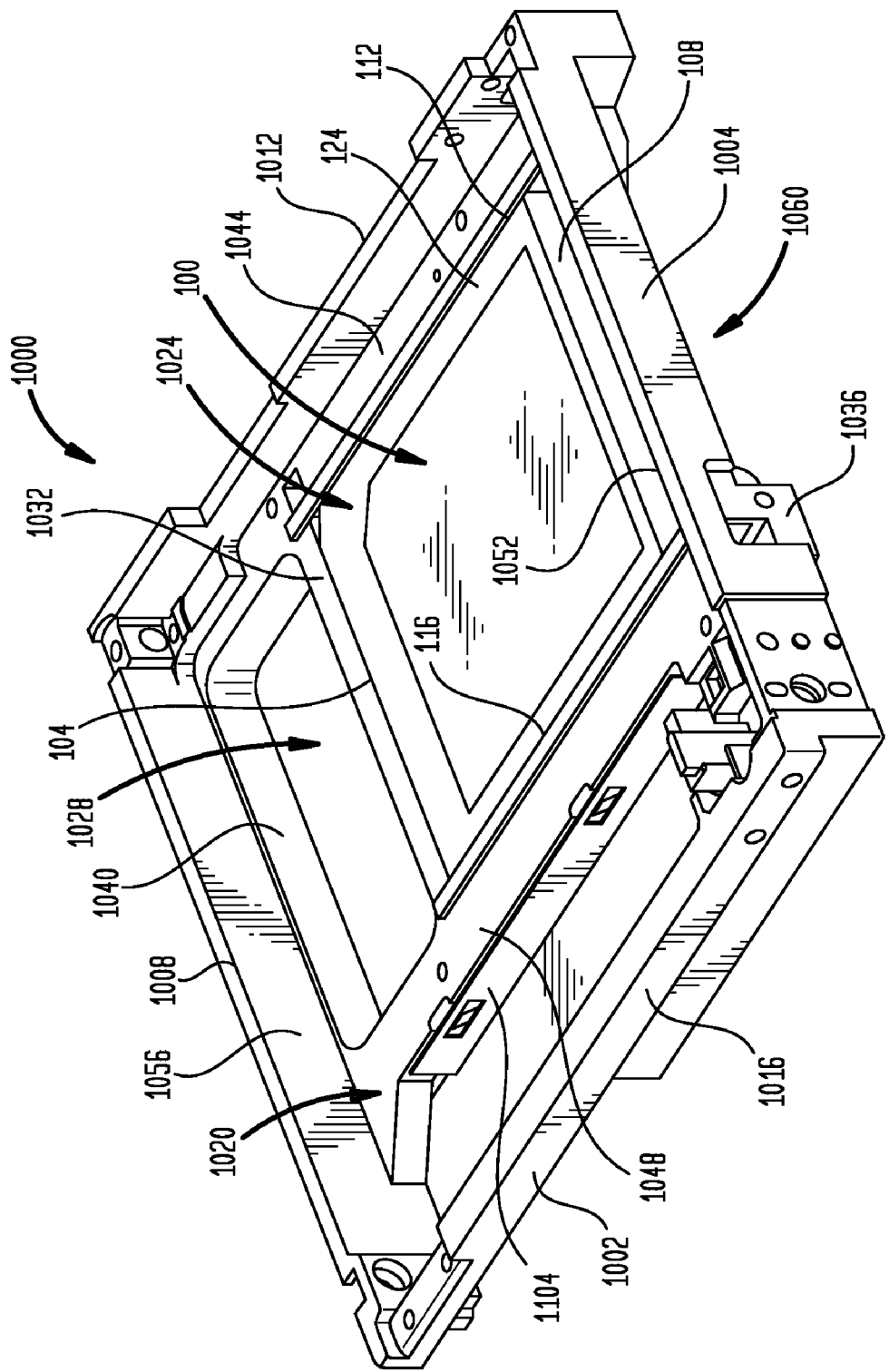
FIG. 10 is a top perspective view of an embodiment of a card connector showing the EROM card of FIGS. 1 through 3 in a card fully inserted position.
Figure 11:
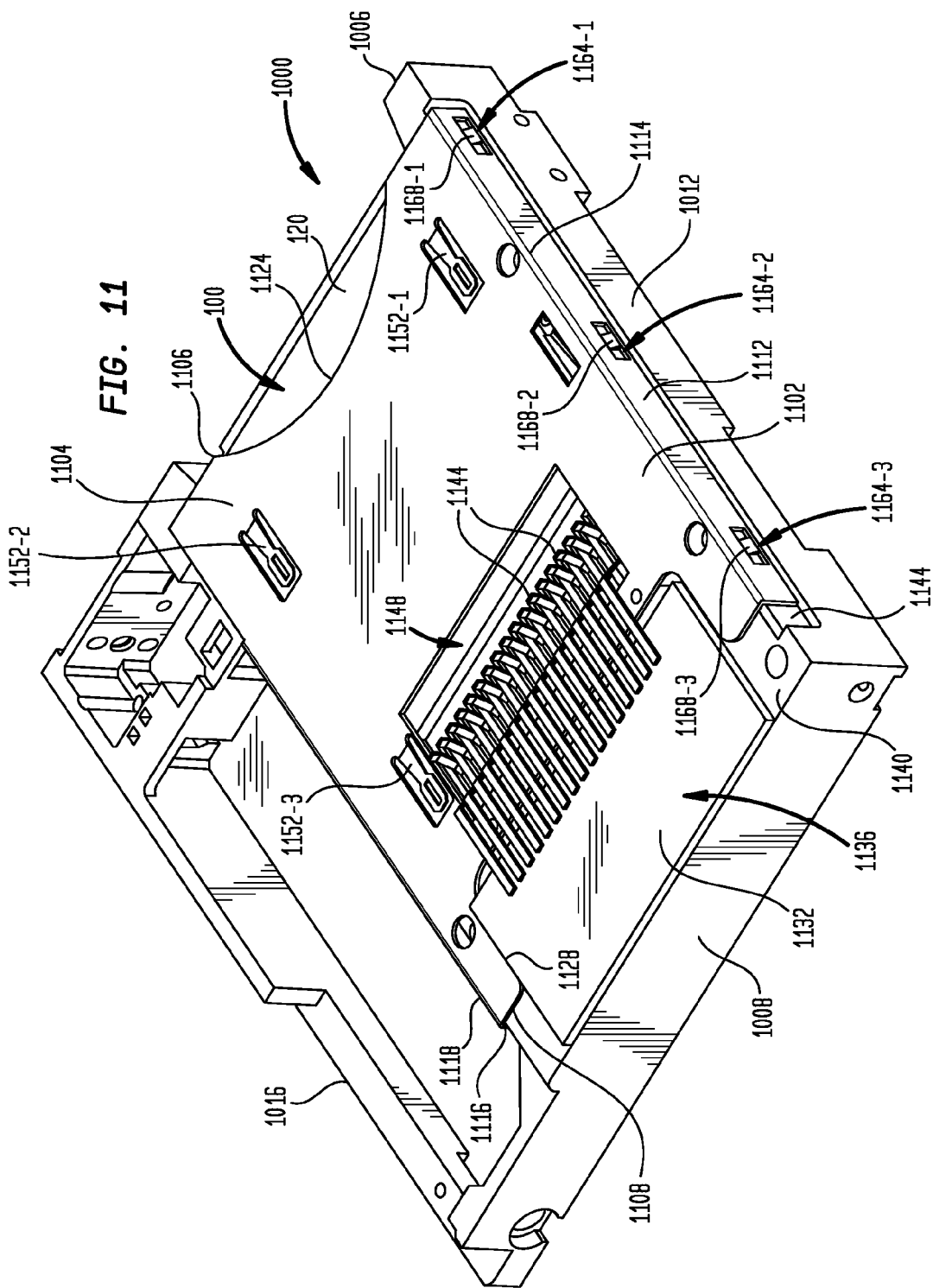
FIG. 11 is a bottom perspective view of the card connector embodiment shown in FIG. 10.
Figure 12:
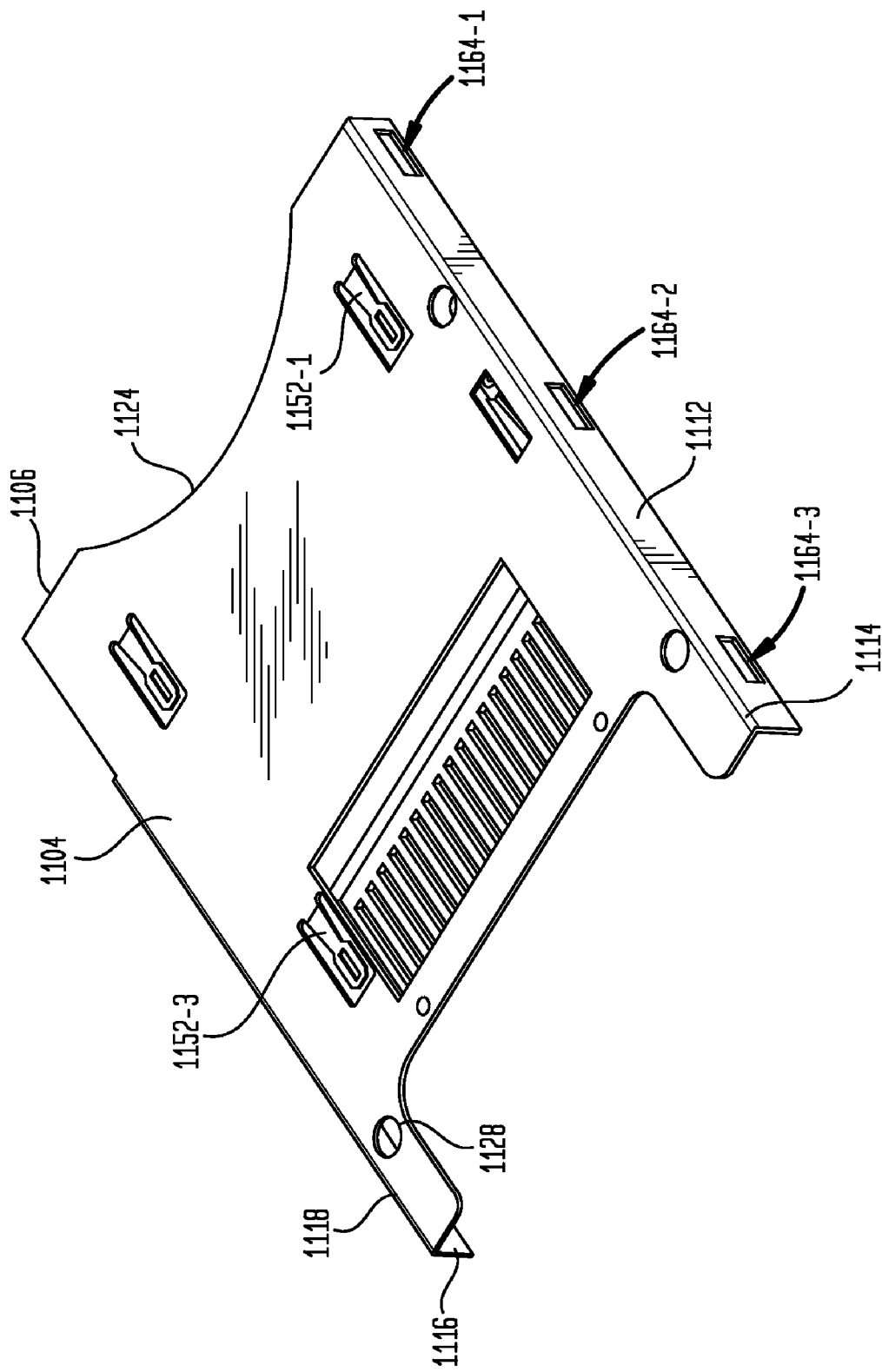
FIG. 12 is bottom perspective view similar to that of FIG. 11 showing one of the components of the card connector embodiment.

FIGS. 10 through 21 illustrate an embodiment of a card connector in the form of, for example, a card socket, indicated generally as 1000, which may be used either separately or integrally with a card reader to read, use and/or display the embodiment of the EROM card 100 of FIGS. 1 through 3, as well as the embodiment of the HROM card 400 of FIGS. 4 through 6. FIGS. 10 through 12 illustrate how EROM card 100 fits within and engages the various components of card socket 1000. Card socket 1000 comprises an outer main r frame 1002 having a generally rectangular or square shape. Outer frame 1002 comprises a front segment 1004, a rear segment 1008 generally parallel to and laterally spaced from front segment 1004, a first side segment 1012 connecting one end of each of front and rear segments 1004 and 1008, and a second side segment 1016 generally parallel to and laterally spaced from first side segment 1012 and connecting the other end of each of front and rear segments 1004 and 1008. Card socket 1000 further comprises an inner memory card receiving frame 1020 having a memory card receiving section, indicated generally as 1024, and an electrical connector section 1028 which are separated by a divider segment 1032 of inner frame 1020. Inner frame 1020 further comprises a front segment 1036, a rear segment 1040 generally parallel to and laterally spaced from front segment 1036, a first side segment 1044 connecting one end of each of front and rear segments 1036 and 1040, and a second side segment 1048 generally parallel to and laterally spaced from first side segment 1044 and connecting the other end of each of front and rear segments 1036 and 1040. As shown in FIG. 10, divider segment 1032 is connected to first and second side segments 1044 and 1048 and is positioned closer to rear segment 1040, relative to front segment 1036. Front segment 1036 of inner frame 1020 is joined, connected secured, etc., to inner surface 1052 of front segment 1004 of outer frame 1002, while rear segment 1040 of inner frame 1020 is joined, connected secured, etc., to inner surface 1056 of rear segment 1004 of outer frame 1002. The manner in which front segment 1036 of inner frame 1020 is joined, connected secured, etc., to inner surface 1052 of front segment 1004 of outer frame 1002 provides memory card insertion port, indicated generally as 1060.

Referring to FIGS. 11 and 12, card socket 1000 further comprises a bottom card cover bracket, indicated generally as 1102, which may be made of a suitable a suitable material having flexible, spring-like characteristics, for example, a sheet metal such as stainless steel. Bracket 1102 comprises a generally rectangular or square-shaped base member 1104 which is joined, connected secured, etc., to inner frame 1020 and which has a frontal edge 1106 and rear edge 1108 laterally spaced apart from frontal edge 1106. Bracket 1102 further comprises a first side wall 1112 connected to and extending generally perpendicularly or orthogonally from one side edge 1114 of base member 1104 from front edge 1004 to rear edge 1008, and a second side wall 1116 generally parallel to and laterally spaced apart from first side wall 1112. Second side wall 1116 is connected to and extends generally perpendicularly or orthogonally from the other side edge 1118 of base member 1104 from front edge 1004 to rear edge 1008. Bracket 1102 provides a memory card receiving or insertion area or slot, indicated generally as 1120, defined as being generally between front edge 1106, rear edge 1108, and side walls 1112 and 1116 (see FIG. 13).

As further shown in FIGS. 11 and 12, front edge 1106 is provided with a generally arcuate shaped recess 1124 between side edges 1114 and 1118, while rear edge 1108 is provided with a generally rectangular-shaped recess 1128 between side edges 1114 and 1118. Recess 1128 allows bracket 1102 to receive the base portion 1132 of electrical connector component 1136 of card socket 1000. Base portion 1132 may be joined, connected secured, etc., to the bottom 1140 of outer frame 1002 at or proximate rear segment 1008. Electrical connector component 1136 further comprises a plurality of electrical contact members in the form of, for example, electrical contact fingers 1144 which are joined, connected secured, etc., at one end to base portion 1132. The other end of electrical contact fingers 1144 extend through a generally rectangular-shaped aperture 1148 formed in base member 1104. As also shown in FIGS. 11 and 12 are a plurality of cantilever-like and spring-like card biasing elements 1152-1 through 1152-3 formed from base member 1104, for exerting an upwards biasing force away from base member 1104 and against the respective bottom section 120 of EROM card 100 or bottom section 520 of HROM card 400 so as to keep the card located against locating surfaces or features of inner frame 1020, as described below) As shown in FIGS. 11 and 13, side wall 1112 has a plurality of spaced apart and generally square shaped apertures 1164-1 through 1164-3 for receiving respective retainer members 1168-1 through 1168-3 protruding outwardly from side segment 1044 of inner frame 1020, to provide one way or mechanism for securing bracket 1102 to inner frame 1020, and thus to card socket 1000. As shown in FIG. 13, similar apertures 1172-1 and 1172-2 may be formed in side wall 1116 for receiving similar retainer members like 1168 (not shown) protruding outwardly from side segment 1040 of inner frame 1020.

Referring to FIGS. 13 and 14, bracket 1102 is provided with an upper memory card engaging surface 1204. Bracket 1102 is also provided with a retainer and/or ejection mechanism, indicated generally as 1212, which may engage retainer and/or rejection features 132 and/or 136, and which is positioned proximate or adjacent to side wall 1112. As also shown in FIGS. 13 and 14, bracket 1102 is also provided with a front-to-rear direction card locator mechanism, indicated generally as 1216, which may engage a front-to-rear locator direction feature in the form of, for example, notch 640 formed in side edge 516) of HROM card 400, as further described below. Front-to-rear direction card locator mechanism 1216 is positioned proximate or adjacent to side wall 1116 and is secured attached, fastened, etc., to the underside of segment 1048 by clip member 1220 (which may be formed integrally with mechanism 1216) by, for example, fasteners (not shown).

Referring to FIGS. 14 and 15, retainer and/or ejection mechanism 1212 comprises a clip member 1304 having a generally vertical stiffening rib portion 1308 shown as extending upwardly and generally perpendicularly or orthogonally relative to upper surface 1204, a generally horizontal main portion 1310 shown as extending generally perpendicularly or orthogonally from rib portion 1308 and towards side wall 1112, and a vertical portion 1312 shown as extending generally upwardly and generally perpendicularly or orthogonally from edge 1316 of main portion 1310. Main portion 1310 is used to secure, attach, fasten, etc., clip member 1304 to the underside of side segment 1044 by, for example, fasteners (not shown). Main portion 1310 is provided with a generally circular-shaped protrusion 1320 extending generally outwardly and upwardly from main portion 1310, and a spring-like cantilever segment 1322 extending generally diagonally and upwardly from edge 1324 proximate protrusion 1320 and towards rear edge 1326 of main portion 1310. Cantilever segment 1322 is provided with an elongated slot 1328 for making the spring-like action of cantilever segment 1322 more "gentle" and to thus reduce the upward biasing force applied by segment 1322). Mechanism 1212 further comprises a slider member 1334, an elongated generally U-shaped link 1338 (which deflects cantilever segment 1322 downwardly towards the plane of main portion so that segment 1322 lies below link 1338) and a biasing member in the form of a coiled spring 1342 having one end 1344 proximate rear edge 1326. Slider member 1334 is provided with a generally cylindrical shaft 1348 which is surrounded by spring 1342 and along which spring 1342 may move laterally. Slider member 1334 is also provided with an inwardly projecting first engagement member 1352 which is positioned to releasably engage first ejection and/or retention feature 132 of EROM card 100, as well as an inwardly projecting second engagement member 1356 which is positioned to releasably engage second ejection and/or retention feature 136 of EROM card 100, as further described below.

Referring to FIG. 14, front-to-rear direction card locator mechanism 1216 further comprises an elongated engagement member, indicated generally as 1364 which is connected to or integral with clip member 1220 and which has at one end thereof a generally V-shaped prong 1368 which may releasably engage notch 640 of HROM card 400, as further described below.

Figure 16:
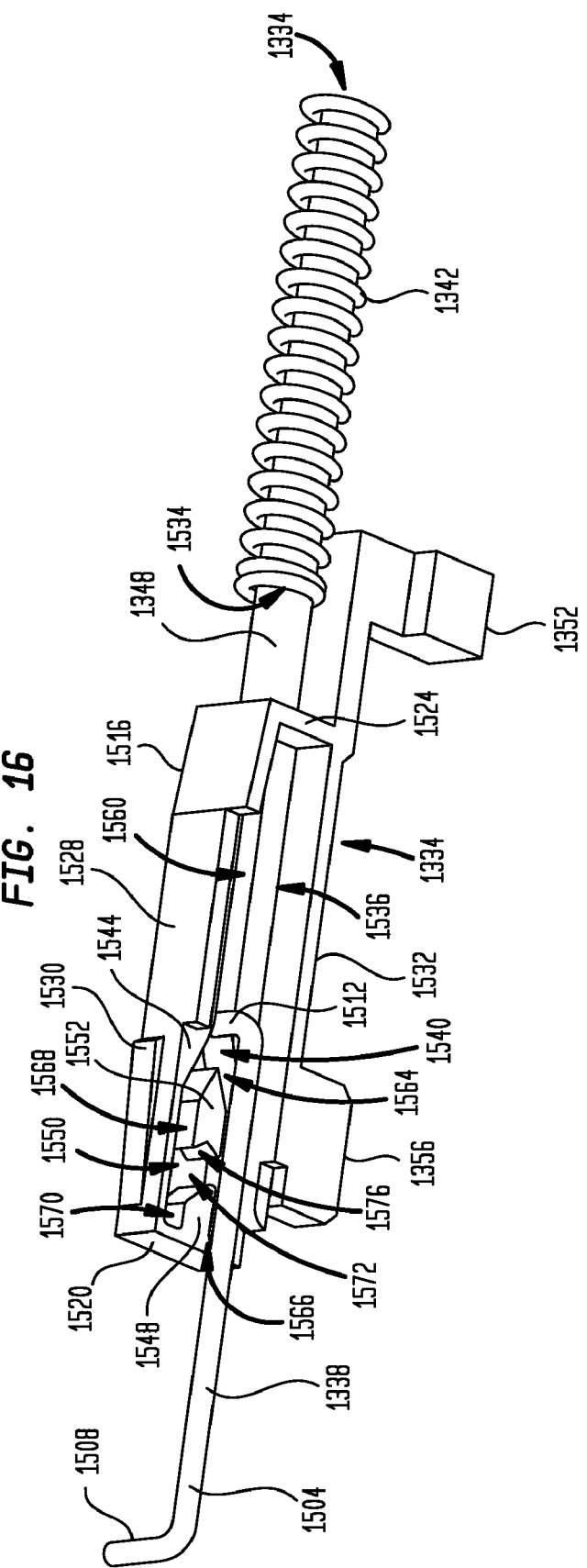
FIG. 16 is an enlarged view of the underside of the ejection/retention mechanisms shown in FIGS. 14 and 15.
Figure 17:
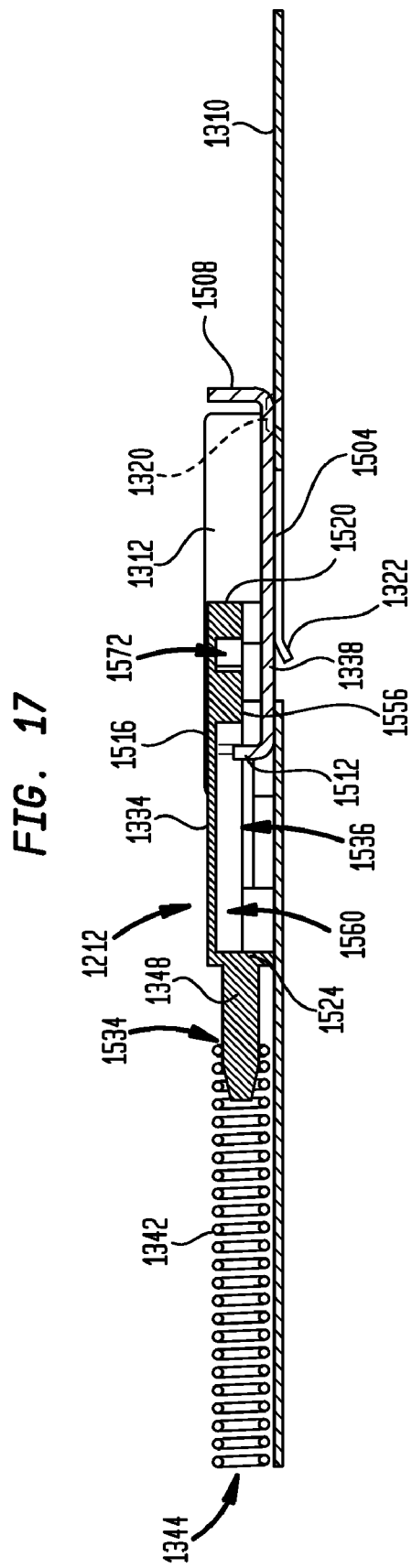
FIG. 17 is a side sectional view of FIG. 14 to further illustrate the ejection/retention mechanism shown FIGS. 14 through 16 in cooperation with other features and/or components of the card connector embodiment.

Referring to FIG. 16, link 1338 is provided with a generally horizontally extending shaft 1504, a first forward prong 1508 extending upwardly from one end of shaft 1504 and a second rearward prong 1512 extending upwardly from the other end of shaft 1504. Shaft 1504 makes contact with the free, unattached end of cantilever segment 1322 (thus preventing segment from returning to an undeformed position), with the lateral positioning of link 1338, relative to clip member 1304, being relatively fixed and limited by first prong 1508 being biased by cantilever segment 1322 (in its deformed state as shown in FIGS. 15 and 17), along with circular protrusion 1320, into, for example, a cylindrical recess (not shown) formed in the side segment 1040, but allowing for at least some pivoting of link 1338 about the axis defined by first prong 1508. Cantilever segment 1322 also biases rearward prong 1512 into a cam recess formed in slider member 1334, as described further below with and shown in FIG. 16. As further shown in FIG. 16, slider member 1334 comprises an upper portion 1516 having a forward end 1520, a rearward portion 1524 extending downwardly from upper portion 1516, a first side portion 1528 extending downwardly from upper portion 1516 and having a feature 1530 proximate forward end 1520 and extending outwardly from first side portion 1528 (for potentially causing slider member 1334 to move or "rock" slightly sideways so that engagement features 1356 and 1352 may be engaged by respective recesses 132/532 and 136/536 of EROM card 100 or HROM card 400 as slider member 1334 initially moves laterally in response to when card 100 or 400, for example, makes contact with engagement feature 1356 and starts to compress spring 1342), a second side portion 1532 extending downwardly from upper portion 1516, with first engagement member 1352 and second engagement member 1356 extend outwardly from second side portion. Side portions 1528 and 1532 are positioned on either side of upper portion 1516 so that these side portions are on either side of cantilever segment 1322 so that slider member 1334 is freely movable laterally forwards (or rearward) relative to segment 1322, as further described below. As shaft 1348 slides rearwardly within spring 1342, rearward portion 1524 (which may be in continuous contact) engages front end 1534 of spring 1342, thus compressing spring 1342, as further described below.

Referring to FIGS. 16 and 17, upper portion 1516, rearward portion 1524 and first and second side portions 1528 and 1532 define a hollow area 1536. As shown in FIG. 15, upper portion 1516 has a generally Y-shaped cam recess 1540 formed in the underside 1544 thereof. Peninsula-shaped protruding feature 1548 of underside 1544 extends into forked portion 1550 of cam recess 1540, while island-shaped protruding feature 1552 is positioned in forked portion 1550 to define a rearward elongated slot 1560; a first branched slot 1564 extending from elongated slot 1560 and terminating in forward end 1566, a second branched slot 1568 extending from rearward slot 1560 and terminating in forward end 1570, and a short transverse slot 1572 connected at each end to first and second branched slots 1564 and 1568. Feature 1548 has a rearward prong-receiving locking notch 1576. In response to the forward or rearward lateral movement of slider member 1334, and in response to the engagement of first and second engagement members 1352 and 1356 by respective retainer and/or ejection features (recesses) 132 and 136, of EROM card 100, rearward prong 1512 may be directed to move within rearward slot 1560, branched slots 1564 or 1568, or transverse slot 1572, which may have shaped, configured, etc., surfaces to direct the movement of rearward prong 1512 within these slots depending on whether slider member 1334 is moving (primarily) laterally forward or rearward, or moving or "rocking" slightly inwardly towards card receiving/insertion area/slot 1120 or outwardly towards sidewall 1112 to engage/disengage engagement members 1352 and 1356 in response to recesses 132/532 and 136/536 of cards 100/400, as further described below.

Figure 18:
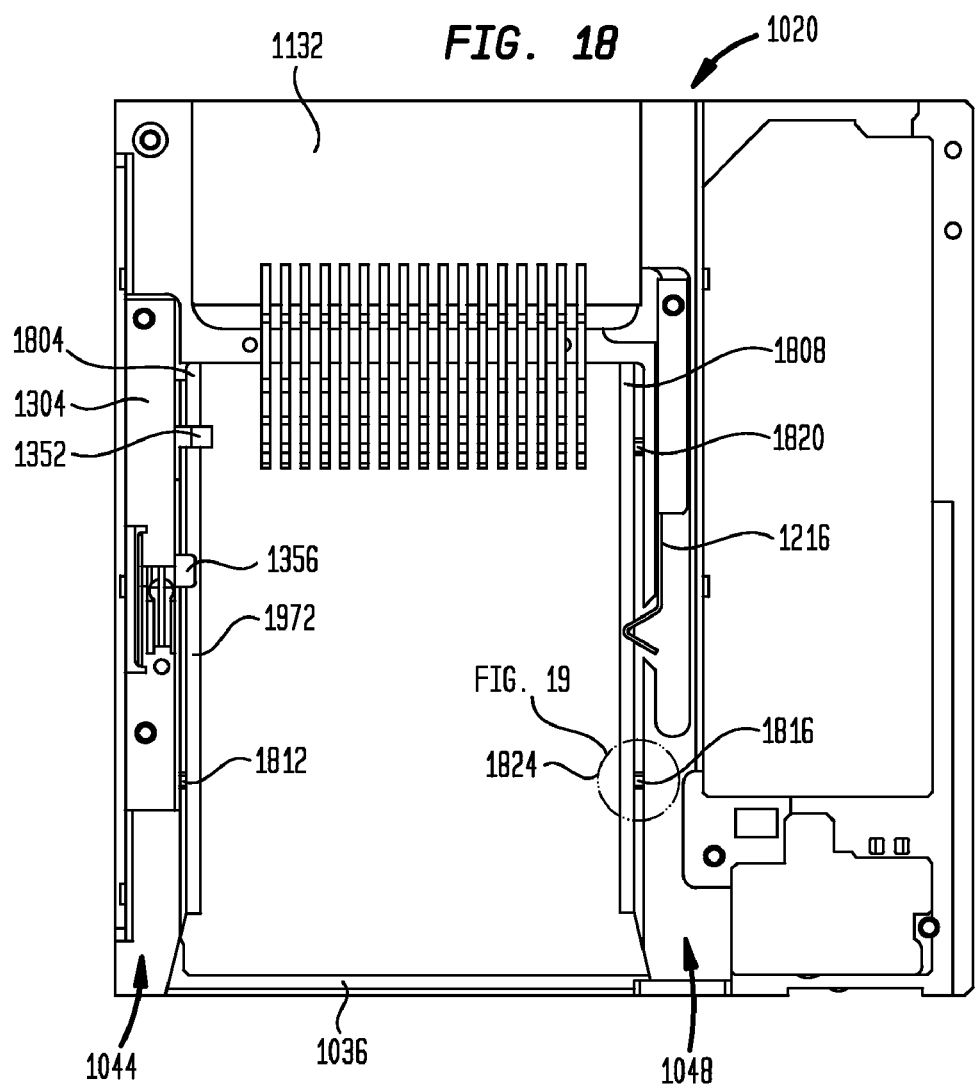
FIG. 18 is perspective view of the underside of one of the components of the card connector embodiment shown in FIGS. 10 through 11 to illustrate features for repeatably locating the EROM card or HROM card when in a fully inserted card position.
Figure 19:
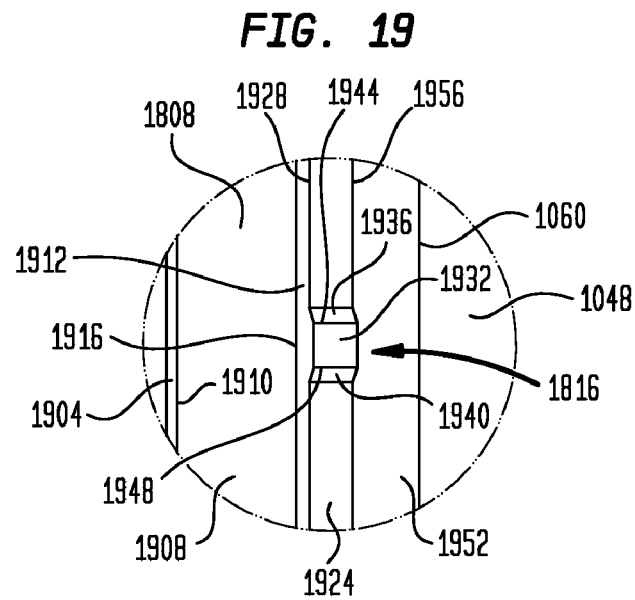
FIG. 19 is an enlarged view of the circled portion of FIG. 18 to better illustrate certain features for repeatably locating the EROM card or HROM card when in a fully inserted card position.

Referring to FIG. 18, a perspective view of the underside of inner frame 1020 is shown to illustrate features for repeatably locating EROM card 100 or HROM card 400 when in a fully inserted card position in card socket position. As shown in FIG. 18, a pair of spaced apart and larger EROM card locating members 1804 and 1808 are provided. Also provided are three smaller HROM card locating members 1812, 1816 and 1820. As shown in FIG. 18, HROM card locating member 1812 is positioned proximate side segment 1044 and nearer or closer to front segment 1036. As also shown FIG. 18, HROM card locating members 1816 and 1820 are positioned proximate side segment 1048, with HROM card locating member 1816 being positioned nearer or closer to front segment 1036, while HROM card locating member 1820 being positioned nearer or closer to rear segment 1040. Referring now to FIG. 19 which shows an enlarged view of circular area 1824, EROM card locating member 1808 (EROM card locating member 1804 is similarly configured) comprises an inner generally vertical side wall 1904, a generally planar and horizontal EROM card locating surface 1908 extending perpendicularly from side wall 1904 at connecting edge 1910, and a generally vertical EROM card locating shoulder 1912 extending generally perpendicularly from EROM card locating surface 1908 at connecting edge 1916. As further shown in FIG. 19, side segment 1048 is provided with a generally planar and horizontal underside surface 1924 (which, in FIG. 19, is oriented generally horizontal and higher than/displaced above surface 1908) which extends generally perpendicularly from EROM card locating shoulder 1912 at connecting edge 1928. As shown in FIG. 19, HROM card locating member 1816 (which is representative of HROM card locating members 1812 and 1818) protrudes outwardly away from surface 1924 and comprises a generally square-shaped, horizontal and planar HROM locating surface 1932 and a pair of rounded flanges 1936 and 1940 adjacent or flanking, respectively, upper edges 1944 and 1948 of surface 1932. As further shown in FIG. 19, the underside of side segment 1048 (which, in FIG. 19, is oriented generally horizontal and higher than/displaced above surface 1924) is further provided with a generally vertical HROM card locating shoulder 1952 extending generally perpendicularly from surface 1924 at connecting edge 1956 and which further includes an upper HROM card notch-engaging edge 1960 which is vertically spaced apart from connecting edge 1956.

When EROM card 100 is in used with card socket 1000, EROM may be inserted into insertion port 1060 and is then received within area/slot 1120 in a partially inserted card position. During insertion of EROM card 100 within area/slot 1120 towards rear edge 1108/rear segment 1008, recess 136 of side edge 112 receives and engages first engagement member 1352 of slider member 1334, followed by recess 136 of side edge 112 receiving and engaging second engagement member 1356 of slider member 1334. As slider member 1334 moves laterally rearward towards rear edge 1108/front segment 1004, and in response to recesses 136 and 132 engaging respective engagement members 1356 and 1352, rearward portion 1524 engages and compresses spring 1342. Rearward prong 1512 also moves forward within cam recess 1540 as slider member 1334 moves laterally rearward towards rear edge 1108/rear segment 1008. To lock slider member 1334 in a relatively fixed position, EROM card 100 is allowed (as necessary) to move slightly forward towards front edge 1106, thus partially decompressing spring 1342 and enabling rearward prong 1512 to reach and be locked within locking notch 1576 (due to the biasing force of spring 1342), thus achieving a fully inserted card position for EROM card 100. During the process of inserting EROM card 100 into area/slot 1120, card biasing elements 1152-1 through 1152-3 press against bottom section 120 and urge EROM card 100 upwardly against EROM card locating surface 1908 of EROM card locating member 1808, as well as EROM card locating surface 1972 of EROM card locating member 1804 such that the side edges of top section 124/top guide surface 324 are pressed against upper inner surfaces of side segments 1044 and 1048. Because the distance between EROM card locating shoulder 1912 and a corresponding EROM card locating shoulder (not shown) which is similar to shoulder 1912 and proximate to EROM card locating member 1804 is slightly wider than the width of EROM card 100 (as defined by side edges 112 and 116), side edges 112 and 116 are seated and pressed against the respective EROM card locating shoulders, thus locating EROM card 10 repeatably in the side-to-side direction, as well as in the bottom-to-top direction.

To eject EROM card 100, EROM card 100 may pushed slightly towards rear edge 1108/rear segment 1008 to unlock rearward prong 1512 from locking notch 1576. Once rearward prong 1512 is unlocked, slider member 1334 may then move laterally forward towards front edge 1106/front segment 1004 (due to the biasing force exerted by spring 1342 as it uncompresses) so that EROM card 100 (due to recesses 136 and 132 still engaging engagement members 1356 and 1352) is move to a partially ejected card position. As engagement members 1356 and 1352 are disengaged from recesses 136 and 132 as EROM card 100 continues to move laterally forward towards front edge 1106/front segment 1004, EROM card 100 reaches a fully ejected card position so that EROM card 100 it may be retrieved from card socket 1000 through port 1060. There may be some "looseness" or clearance between engagement members 1352 and 1356 and respective recesses 132 and 136 to enable engagement members 1352 and 1356 to more easily disengage from recesses 132 and 136 during the ejection operation.

Figure 20:
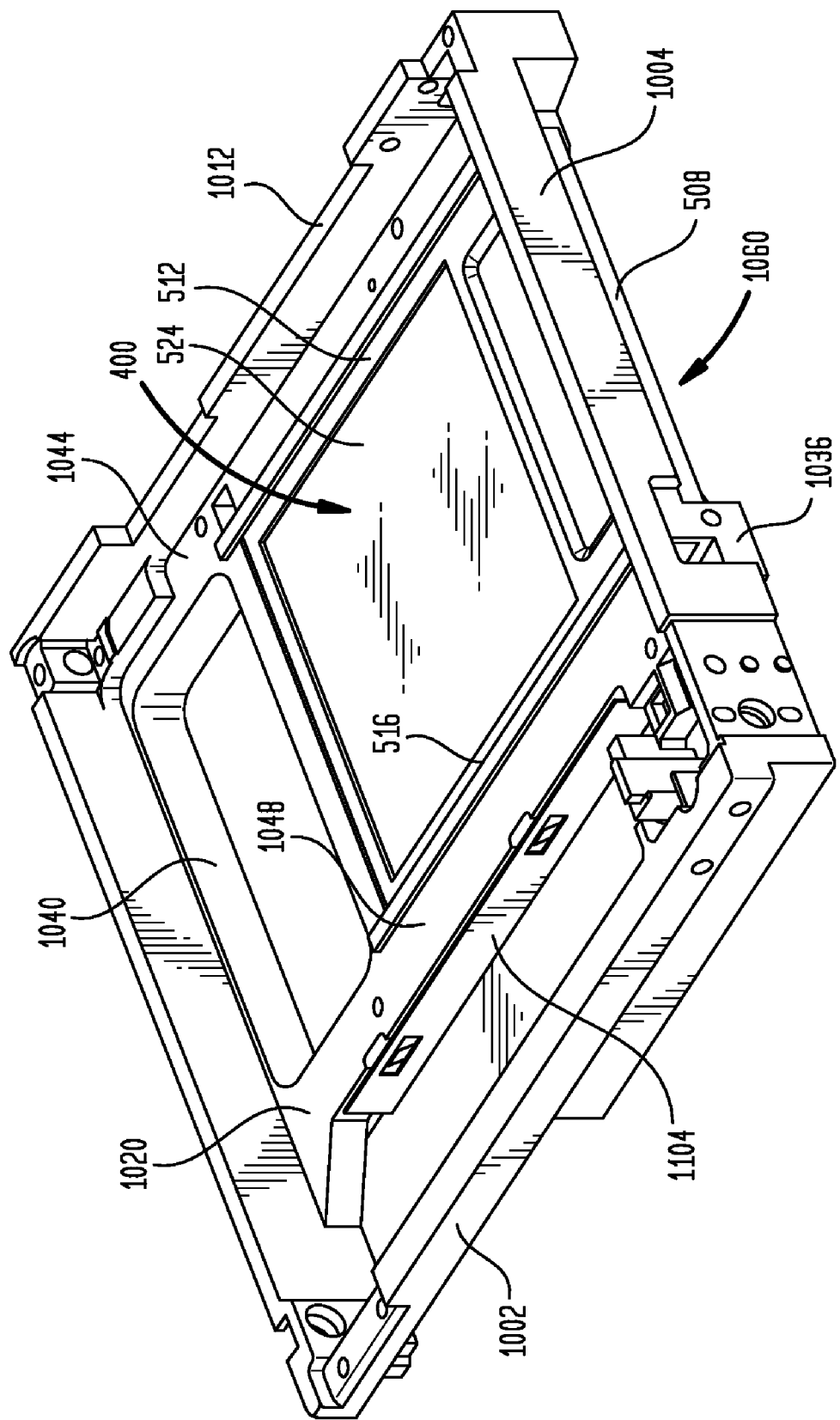
FIG. 20 is top perspective view of the card connector embodiment of FIG. 10, but showing the HROM card of FIGS. 4 through 6 in a fully inserted card position.
Figure 21:
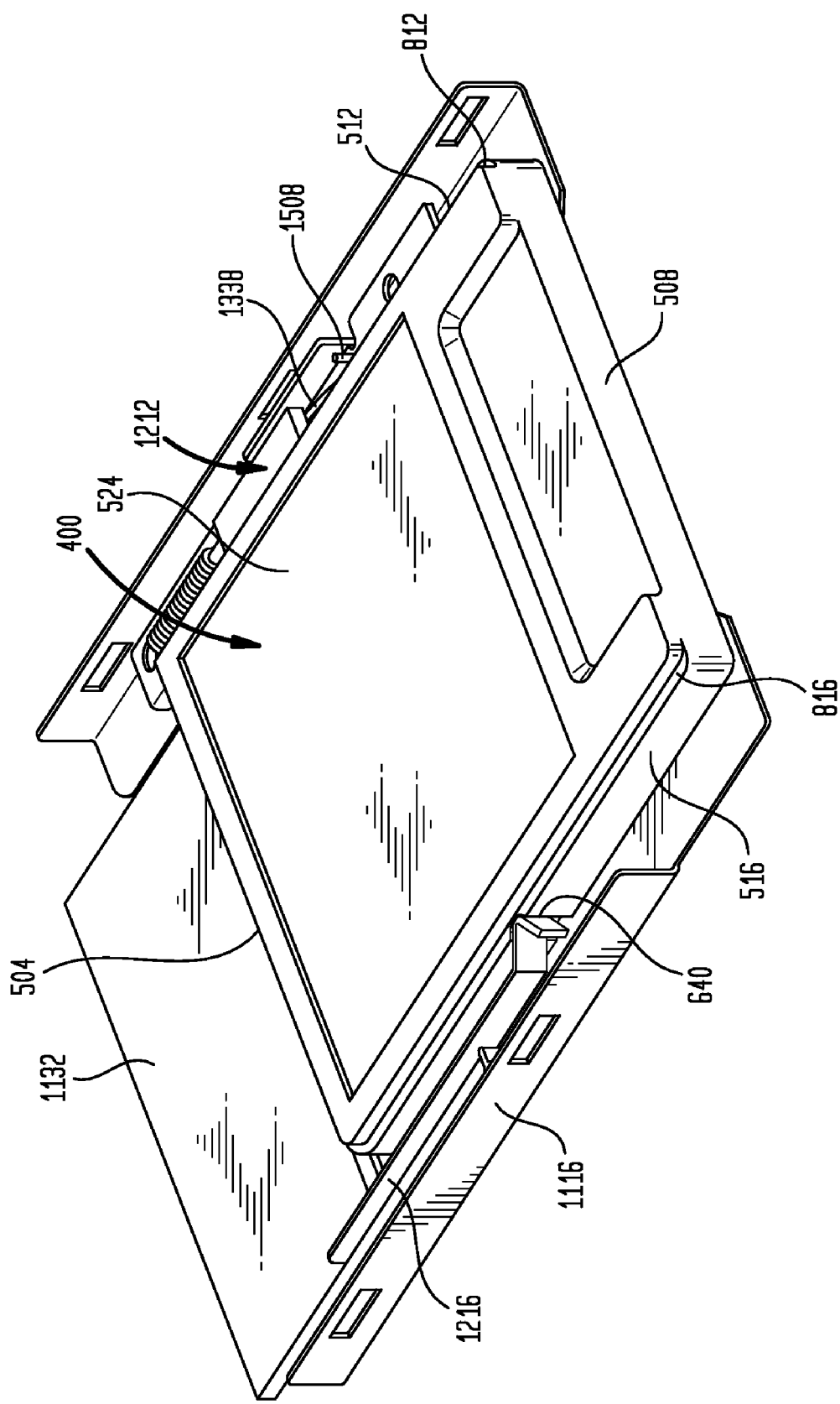
FIG. 21 is a top perspective view similar to that of FIGS. 13 and 20, but with features and/or components of the card connector embodiment removed to better illustrate how the HROM card fits within and cooperates with other features and/or components of the card connector embodiment.

FIGS. 20 and 21 illustrate card socket 1000 when HROM card 400 is inserted through port 1060. The insertion and ejection process for HROM card 400 is similar to that for the EROM card 100 previously described, and further described hereafter. When in a fully inserted card positions, as particularly shown in FIG. 21, mechanism 1212 engages retention/ejection features (recesses) 532 and 536, while front-to-rear direction card locator mechanism 1216 engages front-to-rear direction card locator notch 640. Second engagement member 1356 presses against side edge 512 of HROM card 400, thus causing reference features (protrusions) 544 and 548 along side edge 516 to engage inner surface 1812 of side segment 1012, to thus locate HROM card 400 laterally in the side-to-side direction (e.g., as defined by the direction from side segment 1012 to side segment 1016) within card socket 1000. V-shaped prong 1368 of front-to-rear direction card locator mechanism 1216 engages front-to rear direction locator feature (e.g., notch 640) of HROM card 400, thus locating card 400 repeatably in the front-to-rear direction (e.g., as defined by the direction from front segment 1004 to rear segment 1008) of card socket 1000. Mechanism 1212, which engages retention/ejection features (recesses) 532 and 536, should be "loose" enough in the front-to-rear direction such that HROM card 400 may be positioned in the front-to rear direction by the combination of front-to rear direction locator mechanism 1216 engaging front-to rear direction locator notch 640. In addition, because HROM card 400 (as defined by side edges 512 and 516) is slightly wider than the distance between EROM card locating shoulder 1912 and the corresponding EROM card locating shoulder (not shown) which is similar to shoulder 1912 and proximate to HROM card locating member 1812, respective ridges 802 and 806 of HROM card 400 are pressed upwardly against the HROM card locating surfaces (e.g., surface 1932) of HROM card locating members 1812, 1816 and 1820 (due to the upward biasing force exerted by card biasing elements 1152-1 through 1152-3 press against bottom section 520). Also, notch 816 engages, is seated and pressed against HROM card notch-engaging edge 1960, while notch 812 engages, is seated and pressed against HROM card notch-engaging edge (not shown) which is similar to edge 1960 on the underside of side segment 1044, thus locating HROM card 400 repeatably in the side-to-side direction, as well as in the bottom-to-top direction.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

All documents, patents, journal articles and other materials cited in the present application are hereby incorporated by reference.

What is claimed is:

1. A device comprising a holographic read only memory card which can be coupled to and read by a card reader to which electronic read only memory cards can also be coupled to and read by, the holographic read only memory card comprising:
   a housing having a compartment for receiving a holographic storage medium; and
   a holographic storage medium having stored thereon holographic data;
   wherein the housing comprises one or more card locating members to thereby repeatedly position the holographic read only memory card each time the holographic read only memory card is coupled to the card reader so that the holographic data can be read.

2. The device of claim 1, wherein the housing has a recessed inner compartment which is provided with a retainer section for receiving a holographic storage medium.

3. The device of claim 2, which further comprises a generally rectangular-shaped panel member which includes an electrical contact interface and wherein the housing is generally rectangular-shaped and is provided with a generally rectangular-shaped recessed portion for receiving and retaining the panel member.

4. The device of claim 3, wherein the recessed portion for receiving and retaining the panel member comprises a shoulder on which the panel member is seated.

5. The device of claim 1, wherein the housing comprises a first side edge and a second side edge laterally spaced from the first side edge, and wherein at least one of the first and second side edges is provided with one or more side-to-side card locating members.

6. The device of claim 5, wherein there are at least two side-to-side card locating members which are laterally spaced apart from each other and which are formed in one of the first and second side edges.

7. The device of claim 5, wherein the housing has a width defined by the first and second side edges which is greater than the width of the corresponding electronic read only memory card.

8. The device of claim 5, wherein the housing comprises a top section and a bottom section, and wherein one of the bottom and top sections has a first side portion adjacent the first side edge and having a first side-to-side card locating surface, and a second side portion adjacent the second side edge and having a second side-to-side card locating surface.

9. The device of claim 8, wherein the first and second side-to-side card locating surfaces are recessed.

10. The device of claim 9, wherein one member of the group consisting of the bottom and top sections comprise a pair of laterally spaced apart ridges, each ridge extending along one of the first and second side edges, and wherein one of the first and second side-to-side card locating surfaces is formed at a juncture of each ridge and each side edge.

11. The device of claim 8, wherein the top section has a first side portion adjacent the first side edge, a first side-to-side card locating surface, a second side portion adjacent the second side edge and a second side-to-side card locating surface, and wherein the first and second side-to-side card locating surfaces also function as bottom-to-top locating surfaces.

12. A device comprising a holographic read only memory card which can be coupled to and read by a card reader to which electronic read only memory cards can also be coupled to and read by, the holographic read only memory card comprising:
 a housing having a compartment for receiving a holographic storage medium; and
 a holographic storage medium having stored thereon holographic data; and
 an electronics panel member having an electronic memory component which can be read by the card reader when the holographic read only memory card is coupled to the card reader;
 wherein the housing comprises one or more card locating members to thereby repeatedly position the holographic read only memory card each time the holographic read only memory card is coupled to the card reader so that the holographic data can be read.

13. The device of claim 12, wherein the housing has a recessed inner compartment which is provided with a retainer section for receiving a holographic storage medium.

14. The device of claim 13, which further comprises a generally rectangular-shaped electronics panel member which includes an electrical contact interface and wherein the housing is generally rectangular-shaped and is provided with a generally rectangular-shaped recessed portion for receiving and retaining the electronics panel member.

15. The device of claim 14, wherein the recessed portion for receiving and retaining the electronics panel member comprises a shoulder on which the panel member is seated.

16. The device of claim 14, wherein the electronics panel member includes an electronic memory component, and wherein the recessed compartment includes a portion in which the electronic memory component fits when the electronic panel member is seated on the shoulder of the recessed portion for receiving and retaining the electronics panel member.

17. The device of claim 12, wherein the housing comprises a first side edge and a second side edge laterally spaced from the first side edge, and wherein at least one of the first and second side edges is provided with one or more side-to-side card locating members.

18. The device of claim 17, wherein there are at least two side-to-side card locating members which are laterally spaced apart from each other and which are formed in one of the first and second side edges.

19. The device of claim 17, wherein the housing has a width defined by the first and second side edges which is greater than the width of the corresponding electronic read only memory card.

20. The device of claim 17, wherein the housing comprises a top section and a bottom section, and wherein one of the bottom and top sections has a first side portion adjacent the first side edge and having a first side-to-side card locating surface, and a second side portion adjacent the second side edge and having a second side-to-side card locating surface.

21. The device of claim 20, wherein the first and second side-to-side card locating surfaces are recessed.

22. The device of claim 21, wherein one member of the group consisting of the bottom and top sections comprises a pair of laterally spaced apart ridges, each ridge extending along one of the first and second side edges, and wherein one of the first and second side-to-side card locating surfaces is formed at a juncture of each ridge and each side edge.

23. The device of claim 20, wherein the top section has a first side portion adjacent the first side edge, a first side-to-side card locating surface, a second side portion adjacent the second side edge and a second side-to-side card locating surface, and wherein the first and second side-to-side card locating surfaces also function as bottom-to-top locating surfaces.

24. The device of claim 12, wherein the electronic memory component contains data which can be read.

25. The device of claim 12, wherein the electronic memory component can store data.

26. The device of claim 25, wherein the stored data is changeable.

27. The device of claim 25, wherein the stored data is permanently stored.

28. The device of claim 12, wherein the electronic memory component can do one or more of the following: contain data; store data; or change stored data.

29. The device of claim 12, wherein the electronic memory component comprises an electronic non-volatile memory component.

30. The device of claim 29, wherein the electronic non-volatile memory component can record data.

* * * * *